United States Patent
Xu et al.

(10) Patent No.: US 11,296,845 B2
(45) Date of Patent: Apr. 5, 2022

(54) REFERENCE SIGNAL DESIGNS FOR BEAM MANAGEMENT IN NON-TERRESTRIAL NETWORKS IN 5G SYSTEMS

(71) Applicant: QUALCOMM Incorporated, San Diego, CA (US)

(72) Inventors: Huilin Xu, San Diego, CA (US); Xiao Feng Wang, San Diego, CA (US); Iyab Issam Sakhnini, San Diego, CA (US); Jun Ma, San Diego, CA (US); Dan Zhang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 70 days.

(21) Appl. No.: 16/823,675

(22) Filed: Mar. 19, 2020

(65) Prior Publication Data
US 2020/0313817 A1    Oct. 1, 2020

Related U.S. Application Data

(60) Provisional application No. 62/826,684, filed on Mar. 29, 2019.

(51) Int. Cl.
*H04L 5/00* (2006.01)
*H04L 27/26* (2006.01)
*H04W 72/04* (2009.01)

(52) U.S. Cl.
CPC ........ *H04L 5/0048* (2013.01); *H04L 27/2605* (2013.01); *H04W 72/046* (2013.01)

(58) Field of Classification Search
None
See application file for complete search history.

(56) References Cited

U.S. PATENT DOCUMENTS

| 2011/0053628 A1* | 3/2011 | Kim ................... | H04B 7/18539 455/509 |
| 2013/0252655 A1* | 9/2013 | Kim ..................... | H04B 7/0491 455/509 |

(Continued)

FOREIGN PATENT DOCUMENTS

WO   WO-2019029631 A1   2/2019

OTHER PUBLICATIONS

International Search Report and Written Opinion—PCT/US2020/023797—ISAEPO—May 27, 2020.

(Continued)

*Primary Examiner* — Lonnie V Sweet
(74) *Attorney, Agent, or Firm* — Norton Rose Fulbright LLP

(57) ABSTRACT

Various designs for reference signals for beam management (BM) in non-terrestrial networks (NTNs) in 5G systems are discussed. NTN platforms determine to transmit a BM reference signal associated with a beam in an NTN. The BM reference signal is configured to facilitate beam switching at a wireless communication entity, and the beam having a beam bandwidth. The NTN platforms determines a frequency resource for transmitting the BM reference signal, and transmits, to a wireless communication entity, the BM reference signal in the determined frequency resource. The wireless communication entity monitors the frequency resource, receives the BM reference signal associated with the beam in the frequency resource, and manages beam selection based on the received BM reference signal. Other aspects and features are also claimed and described.

30 Claims, 18 Drawing Sheets

(56) References Cited

U.S. PATENT DOCUMENTS

| | | |
|---|---|---|
| 2018/0324678 A1 | 11/2018 | Chen et al. |
| 2019/0021096 A1 | 1/2019 | Nilsson et al. |
| 2019/0273544 A1* | 9/2019 | Cha .................. H04L 1/0026 |
| 2020/0275523 A1* | 8/2020 | Zhang ............... H04W 56/001 |
| 2020/0373988 A1* | 11/2020 | Wang ................. H04W 16/28 |
| 2021/0120444 A1* | 4/2021 | Yum .................. H04W 72/082 |

OTHER PUBLICATIONS

NTT DOCOMO, et al., "Discussion on NR RRM Measurement based on CSI-RS for L3 Mobility", 3GPP Draft, 3GPP TSG RAN WG1 NR Ad-Hoc#2, R1-1711070_Discussion on NR RRM Measurement based on CSI-RS for L3 Mobility_Final, 3rd Generation Partnership Project (3GPP), Mobile Competence Centre, 650, Route Des Lucioles, F-06921 S, vol. RAN WG1, No. Qingdao, P.R. China, Jun 27, 2017-Jun. 30, 2017, Jun. 17, 2017 (Jun. 17, 2017), XP051305363, 7 pages, Retrieved from the Internet: URL: http://www.3gpp.org/ftp/tsg_ran/WG1_RL1/TSGR1_AH/NR_AH_1706/Docs/, [retrieved on Jun. 17, 2017], Section 2, p. 2.

* cited by examiner

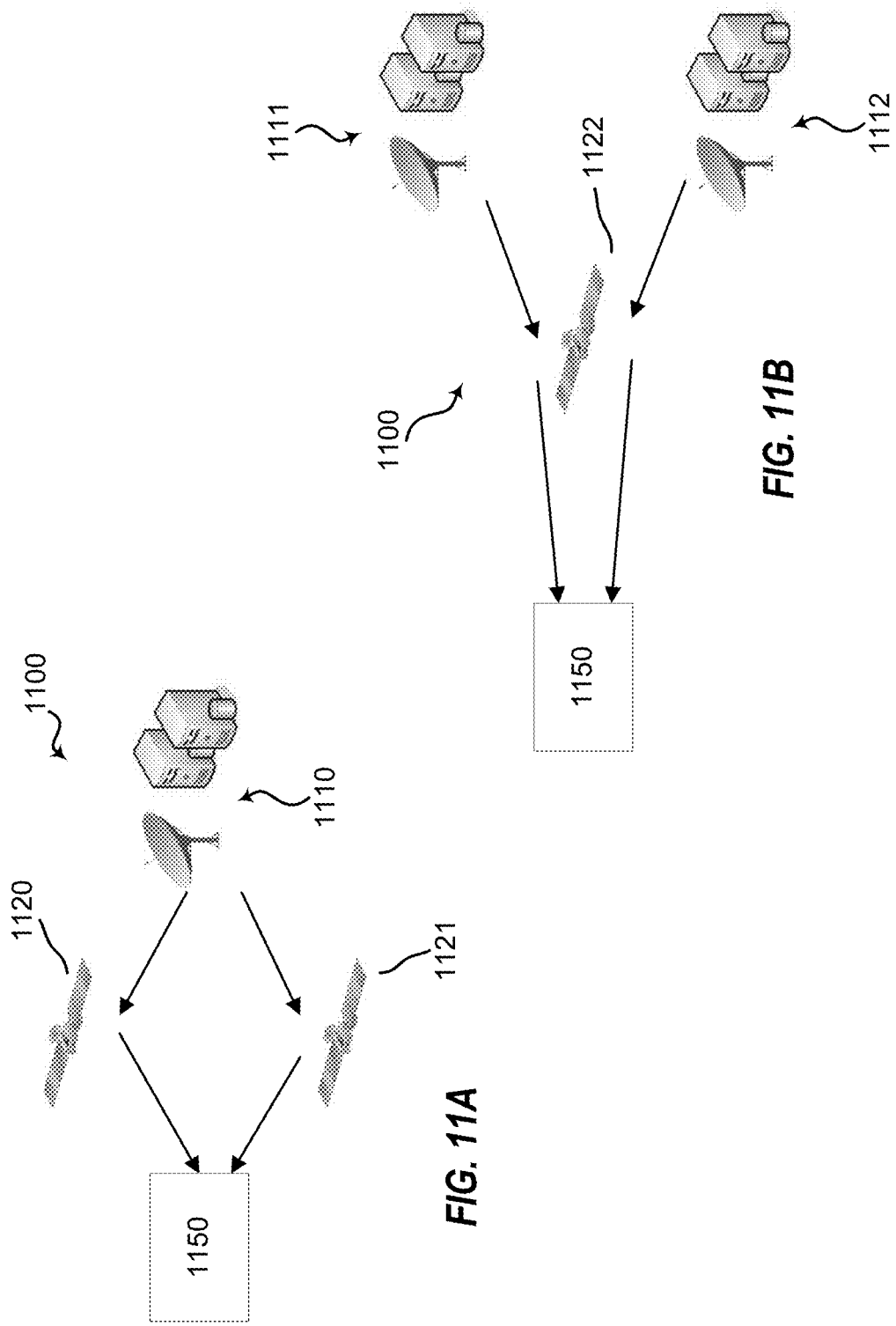

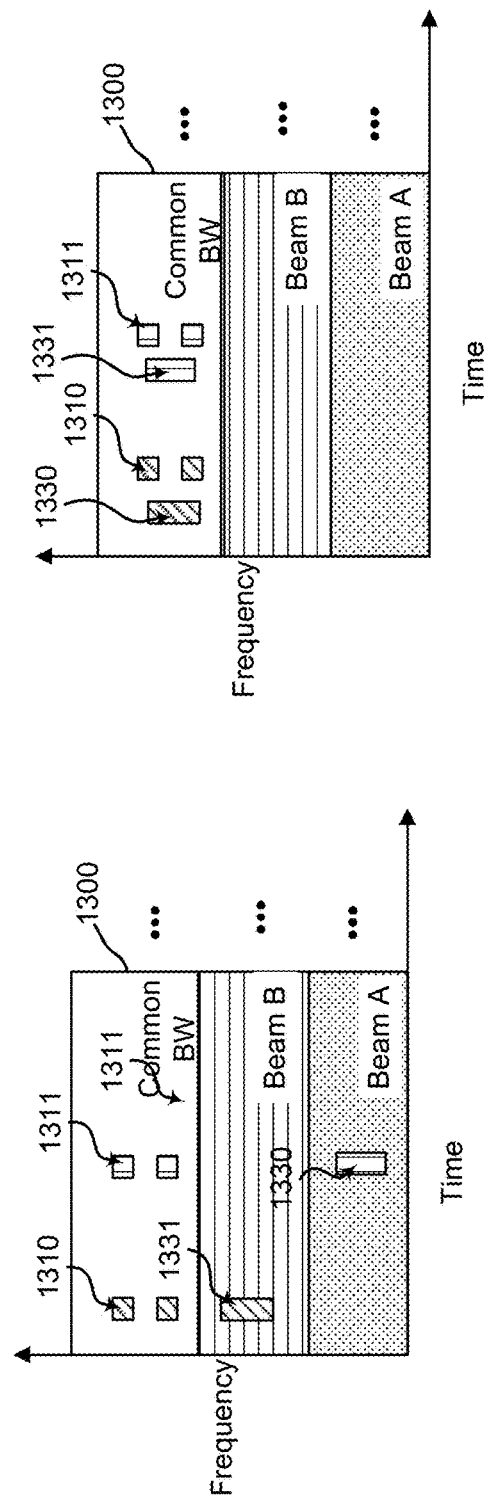
FIG. 13A
FIG. 13B
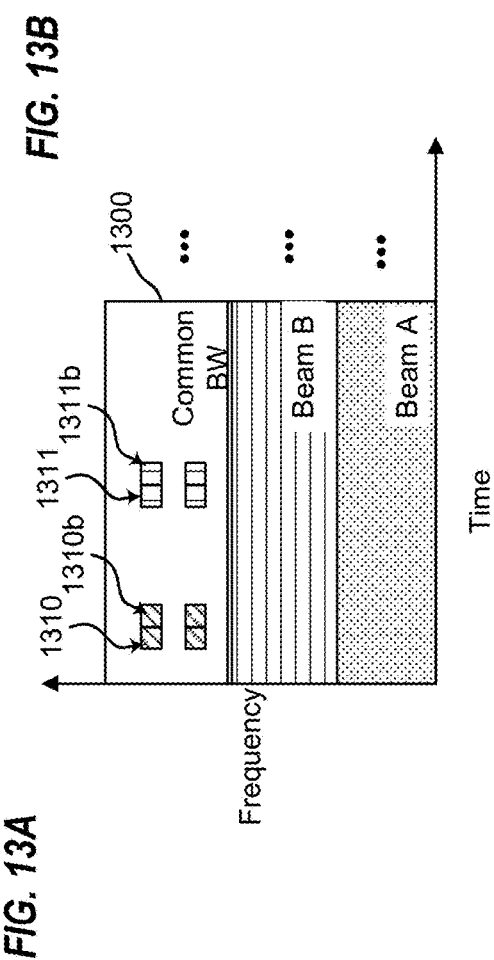
FIG. 13C

REFERENCE SIGNAL DESIGNS FOR BEAM MANAGEMENT IN NON-TERRESTRIAL NETWORKS IN 5G SYSTEMS

CROSS-REFERENCE TO RELATED APPLICATIONS

This application claims the benefit of U.S. Provisional Patent Application No. 62/826,684, entitled, REFERENCE SIGNAL DESIGNS FOR BEAM MANAGEMENT IN NON-TERRESTRIAL NETWORKS IN 5G SYSTEMS," filed on Mar. 29, 2019, which is expressly incorporated by reference herein in its entirety.

BACKGROUND

Technical Field

Aspects of the present disclosure relate generally to wireless communication systems, and more particularly, but without limitation, to reference signals designs for beam management (BM) in non-terrestrial networks (NTNs) in 5G systems.

Background

Wireless communication networks are widely deployed to provide various communication services such as voice, video, packet data, messaging, broadcast, and the like. These wireless networks may be multiple-access networks capable of supporting multiple users by sharing the available network resources. Such networks, which are usually multiple access networks, support communications for multiple users by sharing the available network resources. One example of such a network is the Universal Terrestrial Radio Access Network (UTRAN). The UTRAN is the radio access network (RAN) defined as a part of the Universal Mobile Telecommunications System (UMTS), a third generation (3G) mobile phone technology supported by the 3rd Generation Partnership Project (3GPP). Examples of multiple-access network formats include Code Division Multiple Access (CDMA) networks, Time Division Multiple Access (TDMA) networks, Frequency Division Multiple Access (FDMA) networks, Orthogonal FDMA (OFDMA) networks, and Single-Carrier FDMA (SC-FDMA) networks.

A wireless communication network may include a number of base stations or node Bs that can support communication for a number of user equipments (UEs). A UE may communicate with a base station via downlink and uplink. The downlink (or forward link) refers to the communication link from the base station to the UE, and the uplink (or reverse link) refers to the communication link from the UE to the base station.

A base station may transmit data and control information on the downlink to a UE and/or may receive data and control information on the uplink from the UE. On the downlink, a transmission from the base station may encounter interference due to transmissions from neighbor base stations or from other wireless radio frequency (RF) transmitters. On the uplink, a transmission from the UE may encounter interference from uplink transmissions of other UEs communicating with the neighbor base stations or from other wireless RF transmitters. This interference may degrade performance on both the downlink and uplink.

As the demand for mobile broadband access continues to increase, the possibilities of interference and congested networks grows with more UEs accessing the long-range wireless communication networks and more short-range wireless systems being deployed in communities. Research and development continue to advance wireless technologies not only to meet the growing demand for mobile broadband access, but to advance and enhance the user experience with mobile communications.

SUMMARY

The following summarizes some aspects of the present disclosure to provide a basic understanding of the discussed technology. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

In one aspect of the disclosure, a method of wireless communication includes monitoring, by a wireless communication entity, at least one frequency resource associated with a communication station in an NTN, receiving, by the wireless communication entity, in the at least one frequency resource, at least one BM reference signal associated with at least one beam of the communication station, the at least one beam having a beam bandwidth, and managing, by the wireless communication entity, beam selection based on the at least one BM reference signal.

In some implementations, the BM reference signal includes a channel state information reference signal (CSI-RS).

In some implementations, the BM reference signal is associated with a measurement gap based on a Layer 1 symbol level rate matching.

In an additional aspect of the disclosure, an apparatus configured for wireless communication is disclosed. The apparatus includes at least one processor, and a memory coupled to the processor. The processor is configured to determine to monitor, by a wireless communication entity, at least one frequency resource associated with a communication station in an NTN, to receive, by the wireless communication entity, in the at least one frequency resource, at least one BM reference signal associated with at least one beam of the communication station, the at least one beam having a beam bandwidth, and to manage, by the wireless communication entity, beam selection based on the at least one BM reference signal.

In an additional aspect of the disclosure, a non-transitory computer-readable medium having program code recorded thereon. The program code including program code executable by a computer for causing the computer to monitor, by a wireless communication entity, at least one frequency resource associated with a communication station in an NTN, to receive, by the wireless communication entity, in the at least one frequency resource, at least one BM reference signal associated with at least one beam of the communication station, the at least one beam having a beam bandwidth, and to manage, by the wireless communication entity, beam selection based on the at least one BM reference signal.

In an additional aspect of the disclosure, an apparatus configured for wireless communication includes means for monitoring, by a wireless communication entity, at least one frequency resource associated with a communication station in an NTN, means for receiving, by the wireless communication entity, in the at least one frequency resource, at least one BM reference signal associated with at least one beam of the communication station, the at least one beam having a beam bandwidth, and means for managing, by the wireless communication entity, beam selection based on the at least one BM reference signal.

In one aspect of the disclosure, a method of wireless communication includes determining to transmit a BM reference signal associated with a beam in an NTN, the BM reference signal configured to facilitate beam switching, and the beam having a beam bandwidth, determining a frequency resource for transmitting the BM reference signal, transmitting, to a wireless communication entity, the BM reference signal in the determined frequency resource.

In some implementations, the BM reference signal includes a channel state information reference signal (CSI-RS).

In some implementations, the BM reference signal is associated with a measurement gap based on a Layer 1 symbol level rate matching.

In an additional aspect of the disclosure, an apparatus configured for wireless communication is disclosed. The apparatus includes at least one processor, and a memory coupled to the processor. The processor is configured to determine to transmit a BM reference signal associated with a beam in a n NTN, the BM reference signal configured to facilitate beam switching, and the beam having a beam bandwidth, to determine a frequency resource for transmitting the BM reference signal, and to transmit, to a wireless communication entity, the BM reference signal in the determined frequency resource.

In an additional aspect of the disclosure, a non-transitory computer-readable medium having program code recorded thereon. The program code including program code executable by a computer for causing the computer to determine to transmit a BM reference signal associated with a beam in a n NTN, the BM reference signal configured to facilitate beam switching, and the beam having a beam bandwidth, to determine a frequency resource for transmitting the BM reference signal, and to transmit, to a wireless communication entity, the BM reference signal in the determined frequency resource.

In an additional aspect of the disclosure, an apparatus configured for wireless communication includes means for determining to transmit a BM reference signal associated with a beam in an NTN, the BM reference signal configured to facilitate beam switching, and the beam having a beam bandwidth, means for determining a frequency resource for transmitting the BM reference signal, and means for transmitting, to a wireless communication entity, the BM reference signal in the determined frequency resource.

Other aspects, features, and implementations of the present disclosure will become apparent to those of ordinary skill in the art, upon reviewing the following description of specific, implementations of the present disclosure in conjunction with the accompanying figures. While features of the present disclosure may be discussed relative to certain implementations and figures below, all implementations of the present disclosure can include one or more of the advantageous features discussed herein. In other words, while one or more implementations may be discussed as having certain advantageous features, one or more of such features may also be used in accordance with the various implementations of the disclosure discussed herein. In similar fashion, while exemplary implementations may be discussed below as a device, a system, or a method, the exemplary implementations can be implemented in various devices, systems, and methods.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

FIG. 11A shows an example configuration of an NTN network illustrating time-misalignments.

FIG. 11B shows another example configuration of an NTN network illustrating time-misalignments.

FIG. 13A shows a diagram illustrating an example of timing information received in the beam bandwidth of the beam associated with a BM reference signal.

FIG. 13B shows a diagram illustrating an example of timing information obtained from an SSB/RS received in the common bandwidth.

FIG. 13C shows a diagram illustrating an example of timing information for BM reference signals obtained based on extended symbols.

DETAILED DESCRIPTION

Figure 1:
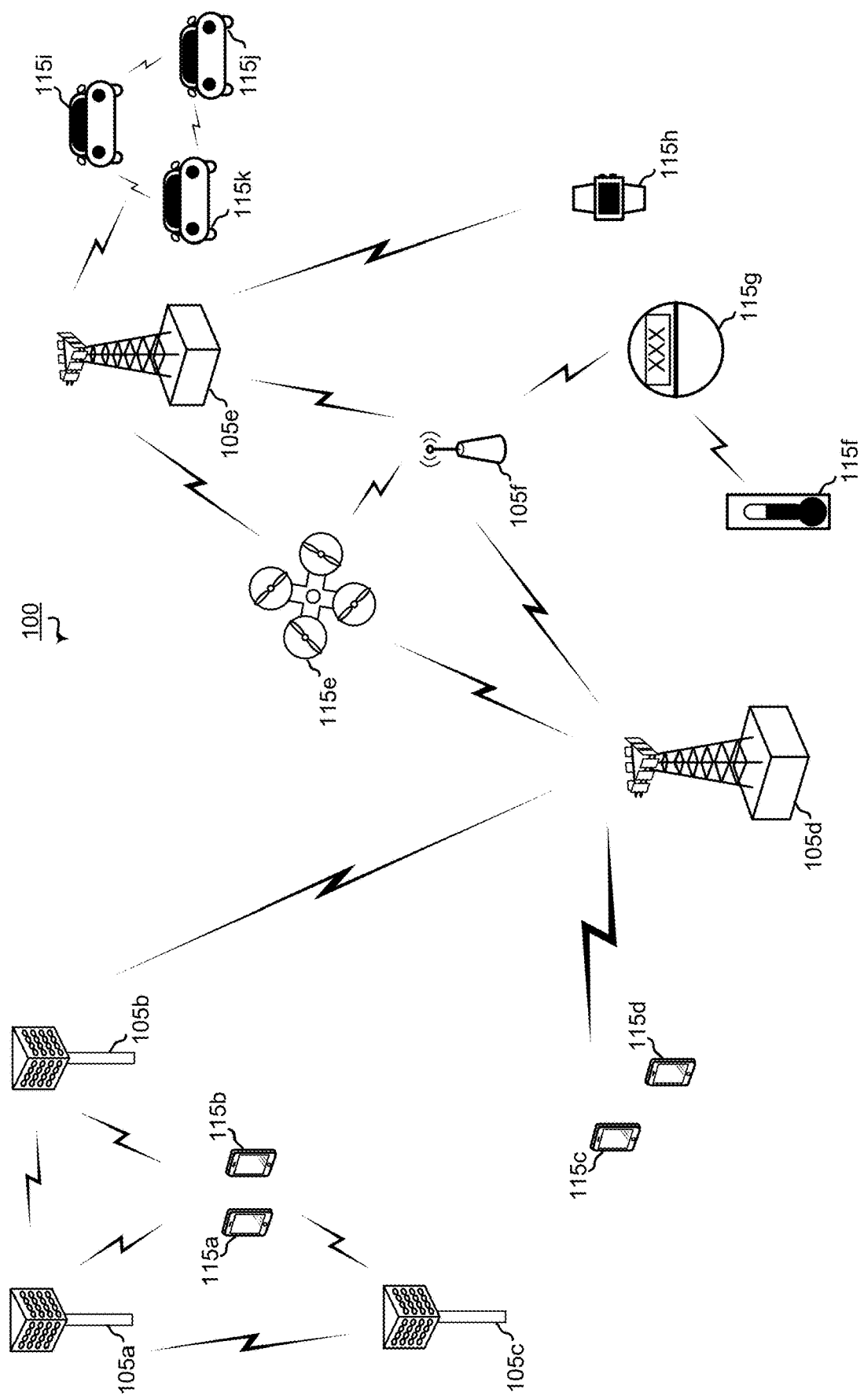
FIG. 1 is a block diagram illustrating details of a wireless communication system.

The detailed description set forth below, in connection with the appended drawings, is intended as a description of various configurations and is not intended to limit the scope of the disclosure. Rather, the detailed description includes specific details for the purpose of providing a thorough understanding of the inventive subject matter. It will be apparent to those skilled in the art that these specific details are not required in every case and that, in some instances, well-known structures and components are shown in block diagram form for clarity of presentation.

This disclosure relates generally to providing or participating in authorized shared access between two or more wireless communications systems, also referred to as wireless communications networks. In various implementations, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, GSM networks, $5^{th}$ Generation (5G) or new radio (NR) networks, as well as other communications networks. As described herein, the terms "networks" and "systems" may be used interchangeably.

An OFDMA network may implement a radio technology such as evolved UTRA (E-UTRA), IEEE 802.11, IEEE 802.16, IEEE 802.20, flash-OFDM and the like. UTRA, E-UTRA, and Global System for Mobile Communications (GSM) are part of universal mobile telecommunication system (UMTS). In particular, long term evolution (LTE) is a release of UMTS that uses E-UTRA. UTRA, E-UTRA, GSM, UMTS and LTE are described in documents provided from an organization named "3rd Generation Partnership Project" (3GPP), and cdma2000 is described in documents from an organization named "3rd Generation Partnership Project 2" (3GPP2). These various radio technologies and standards are known or are being developed. For example, the 3rd Generation Partnership Project (3GPP) is a collaboration between groups of telecommunications associations that aims to define a globally applicable third generation (3G) mobile phone specification. 3GPP long term evolution (LTE) is a 3GPP project which was aimed at improving the universal mobile telecommunications system (UMTS) mobile phone standard. The 3GPP may define specifications for the next generation of mobile networks, mobile systems, and mobile devices. The present disclosure is concerned with the evolution of wireless technologies from LTE, 4G, 5G, NR, and beyond with shared access to wireless spectrum between networks using a collection of new and different radio access technologies or radio air interfaces.

In particular, 5G networks contemplate diverse deployments, diverse spectrum, and diverse services and devices that may be implemented using an OFDM-based unified, air interface. In order to achieve these goals, further enhancements to LTE and LTE-A are considered in addition to development of the new radio technology for 5G NR networks. The 5G NR will be capable of scaling to provide coverage (1) to a massive Internet of things (IoTs) with an ultra-high density (e.g., ~1M nodes/km$^2$), ultra-low complexity (e.g., ~10 s of bits/sec), ultra-low energy (e.g., ~10+ years of battery life), and deep coverage with the capability to reach challenging locations; (2) including mission-critical control with strong security to safeguard sensitive personal, financial, or classified information, ultra-high reliability (e.g., ~99.9999% reliability), ultra-low latency (e.g., ~1 ms), and users with wide ranges of mobility or lack thereof; and (3) with enhanced mobile broadband including extreme high capacity (e.g., ~10 Tbps/km$^2$), extreme data rates (e.g., multi-Gbps rate, 100+ Mbps user experienced rates), and deep awareness with advanced discovery and optimizations.

The 5G NR may be implemented to use optimized OFDM-based waveforms with scalable numerology and transmission time interval (TTI); having a common, flexible framework to efficiently multiplex services and features with a dynamic, low-latency time division duplex (TDD)/frequency division duplex (FDD) design; and with advanced wireless technologies, such as massive multiple input, multiple output (MIMO), robust millimeter wave (mmWave) transmissions, advanced channel coding, and device-centric mobility. Scalability of the numerology in 5G NR, with scaling of subcarrier spacing, may efficiently address operating diverse services across diverse spectrum and diverse deployments. For example, in various outdoor and macro coverage deployments of less than 3 GHz FDD/TDD implementations, subcarrier spacing may occur with 15 kHz, for example over 1, 5, 10, 20 MHz, and the like bandwidth. For other various outdoor and small cell coverage deployments of TDD greater than 3 GHz, subcarrier spacing may occur with 30 kHz over 80/100 MHz bandwidth. For other various indoor wideband implementations, using a TDD over the unlicensed portion of the 5 GHz band, the subcarrier spacing may occur with 60 kHz over a 160 MHz bandwidth. Finally, for various deployments transmitting with mmWave components at a TDD of 28 GHz, subcarrier spacing may occur with 120 kHz over a 500 MHz bandwidth.

The scalable numerology of the 5G NR facilitates scalable TTI for diverse latency and quality of service (QoS) requirements. For example, shorter TTI may be used for low latency and high reliability, while longer TTI may be used for higher spectral efficiency. The efficient multiplexing of long and short TTIs to allow transmissions to start on symbol boundaries. 5G NR also contemplates a self-contained integrated subframe design with uplink/downlink scheduling information, data, and acknowledgement in the same subframe. The self-contained integrated subframe supports communications in unlicensed or contention-based shared spectrum, adaptive uplink/downlink that may be flexibly configured on a per-cell basis to dynamically switch between uplink and downlink to meet the current traffic needs.

Various other aspects and features of the disclosure are further described below. It should be apparent that the teachings herein may be embodied in a wide variety of forms and that any specific structure, function, or both being disclosed herein is merely representative and not limiting. Based on the teachings herein one of an ordinary level of skill in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. For example, a method may be implemented as part of a system, device, apparatus, and/or as instructions stored on a computer readable medium for execution on a processor or computer. Furthermore, an aspect may include at least one element of a claim.

FIG. 1 is a block diagram illustrating 5G network 100 including various base stations and UEs configured according to aspects of the present disclosure. The 5G network 100 includes a number of base stations 105 and other network entities. A base station may be a station that communicates with the UEs and may also be referred to as an evolved node B (eNB), a next generation eNB (gNB), an access point, and the like. Each base station 105 may provide communication coverage for a particular geographic area. In 3GPP, the term "cell" can refer to this particular geographic coverage area of a base station and/or a base station subsystem serving the coverage area, depending on the context in which the term is used.

A base station may provide communication coverage for a macro cell or a small cell, such as a pico cell or a femto cell, and/or other types of cell. A macro cell generally covers a relatively large geographic area (e.g., several kilometers in radius) and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A base station for a macro cell may be referred to as a macro base station. A base station for a small cell may be referred to as a small cell base station, a pico base station, a femto base station or a home base station. In the example shown in FIG. 1, the base stations 105d and 105e are regular macro base stations, while base stations 105a-105c are macro base stations enabled with one of 3 dimension (3D), full dimension (FD), or massive MIMO. Base stations 105a-105c take advantage of their higher dimension MIMO capabilities to exploit 3D beamforming in both elevation and azimuth beamforming to increase coverage and capacity. Base station 105f is a small cell base station which may be a home node or portable access point. A base station may support one or multiple (e.g., two, three, four, and the like) cells.

The 5G network 100 may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time.

The UEs 115 are dispersed throughout the wireless network 100, and each UE may be stationary or mobile. A UE may also be referred to as a terminal, a mobile station, a subscriber unit, a station, or the like. A UE may be a cellular phone, a personal digital assistant (PDA), a wireless modem, a wireless communication device, a handheld device, a tablet computer, a laptop computer, a cordless phone, a wireless local loop (WLL) station, or the like. In one aspect, a UE may be a device that includes a Universal Integrated Circuit Card (UICC). In another aspect, a UE may be a device that does not include a UICC. In some aspects, UEs that do not include UICCs may also be referred to as interne of everything (IoE) devices. UEs 115a-115d are examples of mobile smart phone-type devices accessing 5G network 100 A UE may also be a machine specifically configured for connected communication, including machine type communication (MTC), enhanced MTC (eMTC), narrowband IoT (NB-IoT) and the like. UEs 115e-115k are examples of various machines configured for communication that access 5G network 100. A UE may be able to communicate with any type of the base stations, whether macro base station, small cell, or the like. In FIG. 1, a lightning bolt (e.g., communication links) indicates wireless transmissions between a UE and a serving base station, which is a base station designated to serve the UE on the downlink and/or uplink, or desired transmission between base stations, and backhaul transmissions between base stations.

In operation at 5G network 100, base stations 105a-105c serve UEs 115a and 115b using 3D beamforming and coordinated spatial techniques, such as coordinated multi-point (CoMP) or multi-connectivity. Macro base station 105d performs backhaul communications with base stations 105a-105c, as well as small cell, base station 105f. Macro base station 105d also transmits multicast services which are subscribed to and received by UEs 115c and 115d. Such multicast services may include mobile television or stream video, or may include other services for providing community information, such as weather emergencies or alerts, such as Amber alerts or gray alerts.

5G network 100 also support mission critical communications with ultra-reliable and redundant links for mission critical devices, such UE 115e, which is a drone. Redundant communication links with UE 115e include from macro base stations 105d and 105e, as well as small cell base station 105f. Other machine type devices, such as UE 115f (thermometer), UE 115g (smart meter), and UE 115h (wearable device) may communicate through 5G network 100 either directly with base stations, such as small cell base station 105f, and macro base station 105e, or in multi-hop configurations by communicating with another user device which relays its information to the network, such as UE 115f communicating temperature measurement information to the smart meter, UE 115g, which is then reported to the network through small cell base station 105f. 5G network 100 may also provide additional network efficiency through dynamic, low-latency TDD/FDD communications, such as in a vehicle-to-vehicle (V2V) mesh network between UEs 115i-115k communicating with macro base station 105e.

Figure 2:
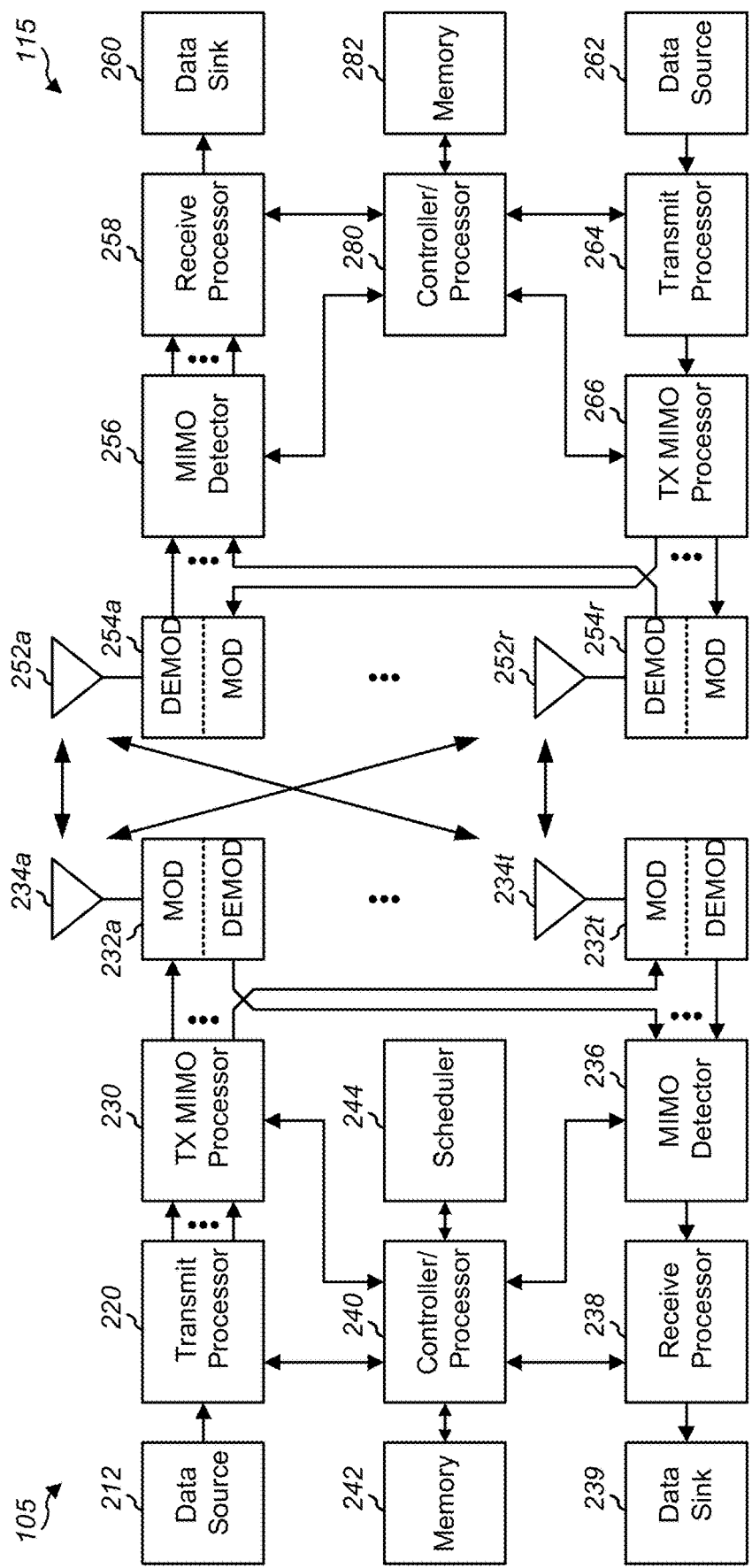
FIG. 2 is a block diagram illustrating a design of a base station and a UE configured according to one aspect of the present disclosure.

FIG. 2 shows a block diagram of a design of a base station 105 and a UE 115, which may be one of the base station and one of the UEs in FIG. 1. At the base station 105, a transmit processor 220 may receive data from a data source 212 and control information from a controller/processor 240. The control information may be for the PBCH, PCFICH, PHICH, PDCCH, EPDCCH, MPDCCH etc. The data may be for the PDSCH, etc. The transmit processor 220 may process (e.g., encode and symbol map) the data and control information to obtain data symbols and control symbols, respectively. The transmit processor 220 may also generate reference symbols, e.g., for the PSS, SSS, and cell-specific reference signal. A transmit (TX) multiple-input multiple-output (MIMO) processor 230 may perform spatial processing (e.g., precoding) on the data symbols, the control symbols, and/or the reference symbols, if applicable, and may provide output symbol streams to the modulators (MODs) 232a through 232t. Each modulator 232 may process a respective output symbol stream (e.g., for OFDM, etc.) to obtain an output sample stream. Each modulator 232 may further process (e.g., convert to analog, amplify, filter, and upconvert) the output sample stream to obtain a downlink signal. Downlink signals from modulators 232a through 232t may be transmitted via the antennas 234a through 234t, respectively.

At the UE 115, the antennas 252a through 252r may receive the downlink signals from the base station 105 and may provide received signals to the demodulators (DE-MODs) 254a through 254r, respectively. Each demodulator 254 may condition (e.g., filter, amplify, downconvert, and digitize) a respective received signal to obtain input samples. Each demodulator 254 may further process the input samples (e.g., for OFDM, etc.) to obtain received symbols. A MIMO detector 256 may obtain received symbols from all the demodulators 254a through 254r, perform MIMO detection on the received symbols if applicable, and provide detected symbols. A receive processor 258 may process (e.g., demodulate, deinterleave, and decode) the detected symbols, provide decoded data for the UE 115 to a data sink 260, and provide decoded control information to a controller/processor 280.

On the uplink, at the UE 115, a transmit processor 264 may receive and process data (e.g., for the PUSCH) from a data source 262 and control information (e.g., for the PUCCH) from the controller/processor 280. The transmit processor 264 may also generate reference symbols for a reference signal. The symbols from the transmit processor 264 may be precoded by a TX MIMO processor 266 if applicable, further processed by the modulators 254a through 254r (e.g., for SC-FDM, etc.), and transmitted to the base station 105. At the base station 105, the uplink signals from the UE 115 may be received by the antennas 234, processed by the demodulators 232, detected by a MIMO detector 236 if applicable, and further processed by a receive processor 238 to obtain decoded data and control information sent by the UE 115. The processor 238 may provide the decoded data to a data sink 239 and the decoded control information to the controller/processor 240.

The controllers/processors 240 and 280 may direct the operation at the base station 105 and the UE 115, respectively. The controller/processor 240 and/or other processors and modules at the base station 105 may perform or direct the execution of various processes for the techniques described herein. The controllers/processor 280 and/or other processors and modules at the UE 115 may also perform or direct the execution of the functional blocks illustrated in FIGS. 4 and 5, and/or other processes for the techniques described herein. The memories 242 and 282 may store data and program codes for the base station 105 and the UE 115, respectively. A scheduler 244 may schedule UEs for data transmission on the downlink and/or uplink.

Wireless communications systems operated by different network operating entities (e.g., network operators) may share spectrum. In some instances, a network operating entity may be configured to use an entirety of a designated shared spectrum for at least a period of time before another network operating entity uses the entirety of the designated shared spectrum for a different period of time. Thus, in order to allow network operating entities use of the full designated shared spectrum, and in order to mitigate interfering communications between the different network operating entities, certain resources (e.g., time) may be partitioned and allocated to the different network operating entities for certain types of communication.

For example, a network operating entity may be allocated certain time resources reserved for exclusive communication by the network operating entity using the entirety of the shared spectrum. The network operating entity may also be allocated other time resources where the entity is given priority over other network operating entities to communicate using the shared spectrum. These time resources, prioritized for use by the network operating entity, may be utilized by other network operating entities on an opportunistic basis if the prioritized network operating entity does not utilize the resources. Additional time resources may be allocated for any network operator to use on an opportunistic basis.

Access to the shared spectrum and the arbitration of time resources among different network operating entities may be centrally controlled by a separate entity, autonomously determined by a predefined arbitration scheme, or dynamically determined based on interactions between wireless nodes of the network operators.

In some cases, UE 115 and base station 105 may operate in a shared radio frequency spectrum band, which may include licensed or unlicensed (e.g., contention-based) frequency spectrum. In an unlicensed frequency portion of the shared radio frequency spectrum band, UEs 115 or base stations 105 may traditionally perform a medium-sensing procedure to contend for access to the frequency spectrum. For example, UE 115 or base station 105 may perform a listen before talk (LBT) procedure such as a clear channel assessment (CCA) prior to communicating in order to determine whether the shared channel is available. A CCA may include an energy detection procedure to determine whether there are any other active transmissions. For example, a device may infer that a change in a received signal strength indicator (RSSI) of a power meter indicates that a channel is occupied. Specifically, signal power that is concentrated in a certain bandwidth and exceeds a predetermined noise floor may indicate another wireless transmitter. A CCA also may include detection of specific sequences that indicate use of the channel. For example, another device may transmit a specific preamble prior to transmitting a data sequence. In some cases, an LBT procedure may include a wireless node adjusting its own backoff window based on the amount of energy detected on a channel and/or the acknowledge/negative-acknowledge (ACK/NACK) feedback for its own transmitted packets as a proxy for collisions.

Use of a medium-sensing procedure to contend for access to an unlicensed shared spectrum may result in communication inefficiencies. This may be particularly evident when multiple network operating entities (e.g., network operators) are attempting to access a shared resource. In 5G network 100, base stations 105 and UEs 115 may be operated by the same or different network operating entities. In some examples, an individual base station 105 or UE 115 may be operated by more than one network operating entity. In other examples, each base station 105 and UE 115 may be operated by a single network operating entity. Requiring each base station 105 and UE 115 of different network operating entities to contend for shared resources may result in increased signaling overhead and communication latency.

Figure 3:
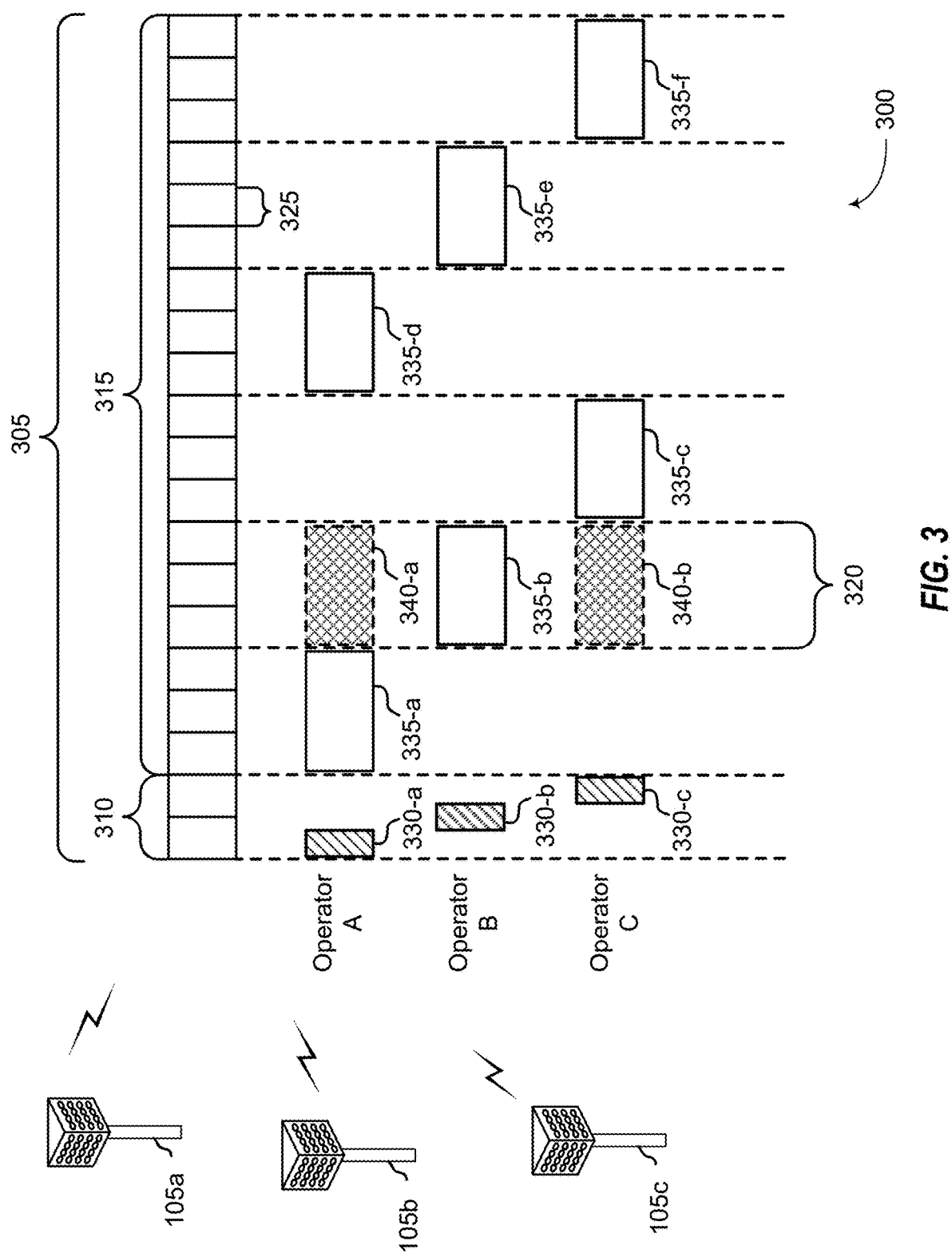
FIG. 3 is a block diagram illustrating a wireless communication system including base stations that use directional wireless beams.

FIG. 3 illustrates an example of a timing diagram 300 for coordinated resource partitioning.

The timing diagram 300 includes a superframe 305, which may represent a fixed duration of time (e.g., 20 ms). Superframe 305 may be repeated for a given communication session and may be used by a wireless system such as 5G network 100 described with reference to FIG. 1. The superframe 305 may be divided into intervals such as an acquisition interval (A-INT) 310 and an arbitration interval 315. As described in more detail below, the A-INT 310 and arbitration interval 315 may be subdivided into sub-intervals, designated for certain resource types, and allocated to different network operating entities to facilitate coordinated communications between the different network operating entities. For example, the arbitration interval 315 may be divided into a plurality of sub-intervals 320. Also, the superframe 305 may be further divided into a plurality of subframes 325 with a fixed duration (e.g., 1 ms). While timing diagram 300 illustrates three different network operating entities (e.g., Operator A, Operator B, Operator C), the number of network operating entities using the superframe 305 for coordinated communications may be greater than or fewer than the number illustrated in timing diagram 300.

The A-INT 310 may be a dedicated interval of the superframe 305 that is reserved for exclusive communications by the network operating entities. In some examples, each network operating entity may be allocated certain resources within the A-INT 310 for exclusive communications. For example, resources 330-a may be reserved for exclusive communications by Operator A, such as through base station 105a, resources 330-b may be reserved for exclusive communications by Operator B, such as through base station 105b, and resources 330-c may be reserved for exclusive communications by Operator C, such as through base station 105c. Since the resources 330-a are reserved for exclusive communications by Operator A, neither Operator B nor Operator C can communicate during resources 330-a, even if Operator A chooses not to communicate during those resources. That is, access to exclusive resources is limited to the designated network operator. Similar restrictions apply to resources 330-b for Operator B and resources 330-c for Operator C. The wireless nodes of Operator A (e.g, UEs 115 or base stations 105) may communicate any information desired during their exclusive resources 330-a, such as control information or data.

When communicating over an exclusive resource, a network operating entity does not need to perform any medium sensing procedures (e.g., listen-before-talk (LBT) or clear channel assessment (CCA)) because the network operating entity knows that the resources are reserved. Because only the designated network operating entity may communicate over exclusive resources, there may be a reduced likelihood of interfering communications as compared to relying on medium sensing techniques alone (e.g., no hidden node problem). In some examples, the A-INT 310 is used to transmit control information, such as synchronization signals (e.g., SYNC signals), system information (e.g., system information blocks (SIBs)), paging information (e.g., physical broadcast channel (PBCH) messages), or random access information (e.g., random access channel (RACH) signals). In some examples, all of the wireless nodes associated with a network operating entity may transmit at the same time during their exclusive resources.

In some examples, resources may be classified as prioritized for certain network operating entities. Resources that are assigned with priority for a certain network operating entity may be referred to as a guaranteed interval (G-INT) for that network operating entity. The interval of resources used by the network operating entity during the G-INT may be referred to as a prioritized sub-interval. For example, resources 335-a may be prioritized for use by Operator A and may therefore be referred to as a G-INT for Operator A (e.g., G-INT-OpA). Similarly, resources 335-b may be prioritized for Operator B, resources 335-c may be prioritized for Operator C, resources 335-d may be prioritized for Operator A, resources 335-e may be prioritized for Operator B, and resources 335-f may be prioritized for operator C.

The various G-INT resources illustrated in FIG. 3 appear to be staggered to illustrate their association with their respective network operating entities, but these resources may all be on the same frequency bandwidth. Thus, if viewed along a time-frequency grid, the G-INT resources may appear as a contiguous line within the superframe 305. This partitioning of data may be an example of time division multiplexing (TDM). Also, when resources appear in the same sub-interval (e.g., resources 340-a and resources 335-b), these resources represent the same time resources with respect to the superframe 305 (e.g., the resources occupy the same sub-interval 320), but the resources are separately designated to illustrate that the same time resources can be classified differently for different operators.

When resources are assigned with priority for a certain network operating entity (e.g., a G-INT), that network operating entity may communicate using those resources without having to wait or perform any medium sensing procedures (e.g., LBT or CCA). For example, the wireless nodes of Operator A are free to communicate any data or control information during resources 335-a without interference from the wireless nodes of Operator B or Operator C.

A network operating entity may additionally signal to another operator that it intends to use a particular G-INT. For example, referring to resources 335-a, Operator A may signal to Operator B and Operator C that it intends to use resources 335-a. Such signaling may be referred to as an activity indication. Moreover, since Operator A has priority over resources 335-a, Operator A may be considered as a higher priority operator than both Operator B and Operator C. However, as discussed above, Operator A does not have to send signaling to the other network operating entities to ensure interference-free transmission during resources 335-a because the resources 335-a are assigned with priority to Operator A.

Similarly, a network operating entity may signal to another network operating entity that it intends not to use a particular G-INT. This signaling may also be referred to as an activity indication. For example, referring to resources 335-b, Operator B may signal to Operator A and Operator C that it intends not to use the resources 335-b for communication, even though the resources are assigned with priority to Operator B. With reference to resources 335-b, Operator B may be considered a higher priority network operating entity than Operator A and Operator C. In such cases, Operators A and C may attempt to use resources of sub-interval 320 on an opportunistic basis. Thus, from the perspective of Operator A, the sub-interval 320 that contains resources 335-b may be considered an opportunistic interval (O-INT) for Operator A (e.g., O-INT-OpA). For illustrative purposes, resources 340-*a* may represent the O-INT for Operator A. Also, from the perspective of Operator C, the same sub-interval 320 may represent an O-INT for Operator C with corresponding resources 340-*b*. Resources 340-*a*, 335-*b*, and 340-*b* all represent the same time resources (e.g., a particular sub-interval 320), but are identified separately to signify that the same resources may be considered as a G-INT for some network operating entities and yet as an O-INT for others.

To utilize resources on an opportunistic basis, Operator A and Operator C may perform medium-sensing procedures to check for communications on a particular channel before transmitting data. For example, if Operator B decides not to use resources 335-*b* (e.g., G-INT-OpB), then Operator A may use those same resources (e.g., represented by resources 340-*a*) by first checking the channel for interference (e.g., LBT) and then transmitting data if the channel was determined to be clear. Similarly, if Operator C wanted to access resources on an opportunistic basis during sub-interval 320 (e.g., use an O-INT represented by resources 340-*b*) in response to an indication that Operator B was not going to use its G-INT, Operator C may perform a medium sensing procedure and access the resources if available. In some cases, two operators (e.g., Operator A and Operator C) may attempt to access the same resources, in which case the operators may employ contention-based procedures to avoid interfering communications. The operators may also have sub-priorities assigned to them designed to determine which operator may gain access to resources if more than operator is attempting access simultaneously.

In some examples, a network operating entity may intend not to use a particular G-INT assigned to it, but may not send out an activity indication that conveys the intent not to use the resources. In such cases, for a particular sub-interval 320, lower priority operating entities may be configured to monitor the channel to determine whether a higher priority operating entity is using the resources. If a lower priority operating entity determines through LBT or similar method that a higher priority operating entity is not going to use its G-INT resources, then the lower priority operating entities may attempt to access the resources on an opportunistic basis as described above.

In some examples, access to a G-INT or O-INT may be preceded by a reservation signal (e.g., request-to-send (RTS)/clear-to-send (CTS)), and the contention window (CW) may be randomly chosen between one and the total number of operating entities.

In some examples, an operating entity may employ or be compatible with coordinated multipoint (CoMP) communications. For example an operating entity may employ CoMP and dynamic time division duplex (TDD) in a G-INT and opportunistic CoMP in an O-INT as needed.

In the example illustrated in FIG. 3, each sub-interval 320 includes a G-INT for one of Operator A, B, or C. However, in some cases, one or more sub-intervals 320 may include resources that are neither reserved for exclusive use nor reserved for prioritized use (e.g., unassigned resources). Such unassigned resources may be considered an O-INT for any network operating entity, and may be accessed on an opportunistic basis as described above.

In some examples, each subframe 325 may contain 14 symbols (e.g., 250-µs for 60 kHz tone spacing). These subframes 325 may be standalone, self-contained Interval-Cs (ITCs) or the subframes 325 may be a part of a long ITC. An ITC may be a self-contained transmission starting with a downlink transmission and ending with a uplink transmission. In some implementations, an ITC may contain one or more subframes 325 operating contiguously upon medium occupation. In some cases, there may be a maximum of eight network operators in an A-INT 310 (e.g., with duration of 2 ms) assuming a 250-µs transmission opportunity.

Although three operators are illustrated in FIG. 3, it should be understood that fewer or more network operating entities may be configured to operate in a coordinated manner as described above. In some cases, the location of the G-INT, O-INT, or A-INT within superframe 305 for each operator is determined autonomously based on the number of network operating entities active in a system. For example, if there is only one network operating entity, each sub-interval 320 may be occupied by a G-INT for that single network operating entity, or the sub-intervals 320 may alternate between G-INTs for that network operating entity and O-INTs to allow other network operating entities to enter. If there are two network operating entities, the sub-intervals 320 may alternate between G-INTs for the first network operating entity and G-INTs for the second network operating entity. If there are three network operating entities, the G-INT and O-INTs for each network operating entity may be designed as illustrated in FIG. 3. If there are four network operating entities, the first four sub-intervals 320 may include consecutive G-NRF INTs for the four network operating entities and the remaining two sub-intervals 320 may contain O-INTs. Similarly, if there are five network operating entities, the first five sub-intervals 320 may contain consecutive G-INTs for the five network operating entities and the remaining sub-interval 320 may contain an O-INT. If there are six network operating entities, all six sub-intervals 320 may include consecutive G-INTs for each network operating entity. It should be understood that these examples are for illustrative purposes only and that other autonomously determined interval allocations may be used.

It should be understood that the coordination framework described with reference to FIG. 3 is for illustration purposes only. For example, the duration of superframe 305 may be more or less than 20 ms. Also, the number, duration, and location of sub-intervals 320 and subframes 325 may differ from the configuration illustrated. Also, the types of resource designations (e.g., exclusive, prioritized, unassigned) may differ or include more or less sub-designations.

Figure 6:
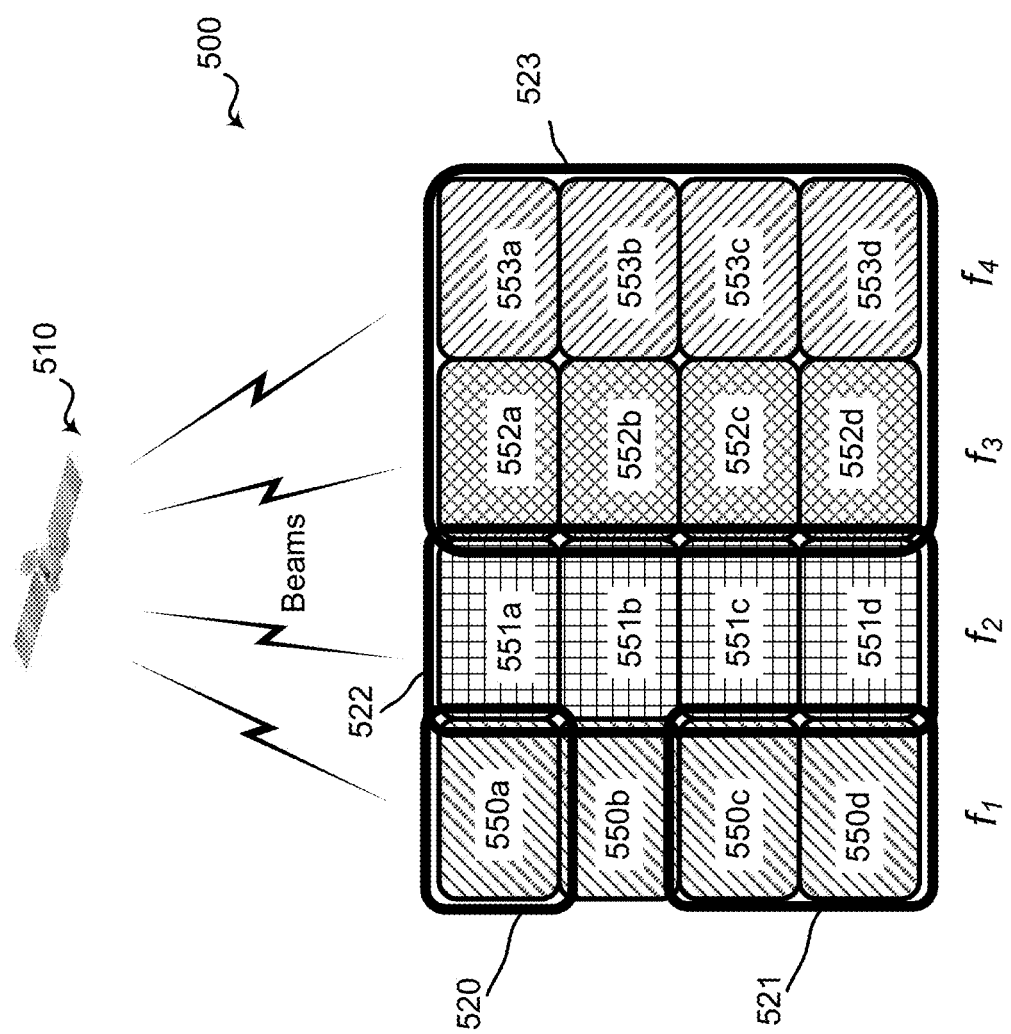
FIG. 6 is a diagram illustrating an example NTN system configured for beam management operations according to aspects of the present disclosure.

Non-terrestrial networks (NTNs) are expected to play a large and important role in 5G systems. In general, NTNs may refer to networks, or network segments, that employ space-based and/or airborne platforms or vehicles (e.g., satellites, balloons, airships, unmanned aerial vehicles (UAVs), etc.) for communications. These space-based and/or airborne platforms are typically less vulnerable to natural disasters and/or physical attacks than ground-based nodes, and may also provide wider service coverage given their altitude. NTN platforms may be categorized into high altitude platform stations (HAPS) (which may include balloons, airships, UAVs, tethered UAVs, etc.), and satellites. NTN platforms may be equipped with multiple antennas, each antenna covering a particular geographical area on the surface of the earth. For each antenna, a beam may be transmitted to cover the particular geographical area or the antenna. For example, with reference to FIG. 6, NTN platform 510 of NTN system 500 is shown. NTN platform 510 may be equipped with multiple antennas, and a beam may be transmitted by each antenna, to provide communications coverage to a particular area. In the coverage footprint shown in FIG. 6, each of beams 550*a-d* to 553*a-d* may provide communication coverage for its respective area. The beams may be clustered together based on the frequency range within which the beams are transmitted. For example, beams 550a-550d may be transmitted within frequency range $f_1$. In this case, beams 550a-550d may be clustered together in a single cluster. Similarly, beams 553a-553d may be transmitted within frequency range $f_4$. In this case, beams 553a-553d may be clustered together in a single cluster. In implementations, all beams transmitted within a particular frequency range (e.g., $f_1$, $f_2$, $f_3$, $f_4$, etc.) are said to be in the same cluster. Conversely, different clusters may have different frequency ranges. Each of the beams may have a particular beam bandwidth, and the beam bandwidth of each beam may include a frequency resource within the frequency range of the cluster to which the beam belongs. In that sense, the beam bandwidth of a beam may be a frequency range indicating the size and location of the frequency resource where signals associated with the beam are to be transmitted. Moreover, as used herein, a frequency resource may include the beam bandwidth of a beam.

Beam management (BM) may refer to the mechanism used to select an optimal beam at a wireless communication entity, e.g., a UE, base station, an access point (AP), or a ground station (GS), based on measurements of signal quality of the candidate beams. It is noted here that although the discussion that follows is at times focused on functionality with respect to a UE, the same functionality may be applicable to other wireless communication entities, e.g., base stations, relay nodes, APs, etc. In 5G, BM may be accomplished using various approaches. In one case, BM in 5G may be based on a synchronization signal block (SSB) signal. In this case, a UE may be in an idle state and may measure the signal quality of the SSB (e.g., a reference signal received power (RSRP)). Based on the quality of the SSB signal for the various beams, the UE may select the optimal beam for communications. However, SSB signals may be narrow band and may be transmitted on fixed frequency locations. In another case, BM in 5G may be based on a channel state information reference signal (CSI-RS). In this case, a UE may be in an active state and may measure the CSI-RS. Based on the CSI-RS, the UE may select the optimal beam for communications. An advantage of the CSI-RS approach for BM is that the CSI-RS may be flexibly configured by the network in a radio resource control (RRC) message or a PDCCH in periodic, semi-persistent, or dynamic configuration mode. Additionally, the CSI-RS may be configured in wideband such that the channel quality may be accurately measured in the entire bandwidth of the beam. In general, the 5G BM approaches are focused on intra-frequency beam operations, (e.g., beams that may be on the same frequency range, or cluster).

Various aspects of the present disclosure are directed to providing a mechanism for beam management in NTNs. For example, aspects of the present disclosure provide various mechanisms for managing configurations for transmission and reception of BM reference signals (e.g., BM CSI-RS) that may be used for beam management. The BM reference signals may be used for beam selection/switching between intra-frequency beams and inter-frequency beams. As such, the aspects of the present disclosure provide an advantageous approach for NTN BM. In aspects, the approach for BM for intra-frequency beams may be similar to 5G BM disclosed above. For example, intra-frequency BM may employ a BM SSB and/or a BM CSI-RS approach. The approach for BM for inter-frequency beams may be an approach specific to NTN BM. For example, various aspects of the present disclosure provide mechanisms for communicating BM reference signals (e.g., BM CSI-RS) associated with a beam in a bandwidth associated with the beam bandwidth of the beam (e.g., in the frequency resource of the beam bandwidth of the beam associated with the BM reference signal). For example, BM reference signals associated with beam 553a may be transmitted/received within the beam bandwidth of beam 553a. Various aspects of the present disclosure also provide mechanisms for communicating BM reference signals associated with a beam in a bandwidth outside the beam bandwidth of the beam (e.g., in a frequency resource outside the beam bandwidth of the beam associated with the BM reference signal). For example, BM reference signals associated with beam 553a may be transmitted/received within the beam bandwidth of beam 553d, or within the beam bandwidth of beam 552a. It will be appreciated that a bandwidth outside the beam bandwidth of the beam may be a bandwidth of another beam within the same cluster as the beam (e.g., within the same frequency range, or intra-frequency beam) or another beam in a different cluster as the beam (e.g., within a different frequency range, or inter-frequency beam). In some aspects, the bandwidth outside the beam bandwidth of the beam may be a common bandwidth that is common to multiple inter-frequency beams. In aspects, a mixture of the two approaches above may be employed. In this hybrid approach, a BM reference signal (e.g., BM CSI-RS) associated with a beam may be transmitted in a bandwidth associated with the beam bandwidth of the beam and may also be transmitted in a bandwidth outside the beam bandwidth of the beam (e.g., a common bandwidth).

It is noted that, as used herein, a frequency resource of a BM reference signal may refer to a frequency range within which the BM reference signal may be transmitted, and a frequency resource of a beam bandwidth of a beam may refer to the frequency range of the beam bandwidth of the beam within which the data channel is transmitted. Additionally, each beam of the NTN may have one or more associated BM reference signals.

Figure 4:
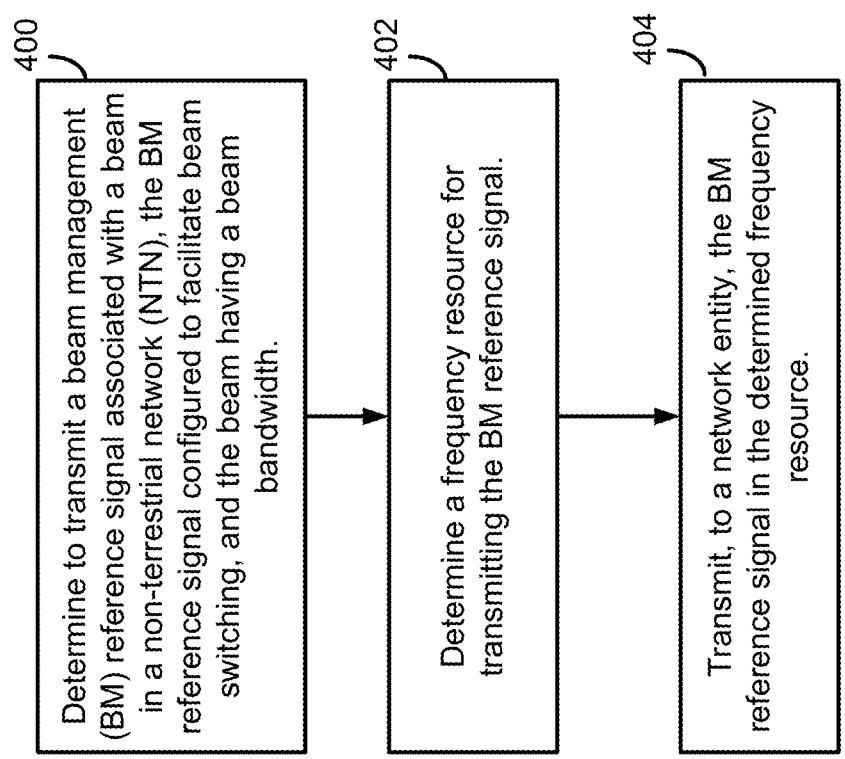
FIG. 4 is a block diagram illustrating example blocks executed to implement aspects of the present disclosure.
Figure 5:
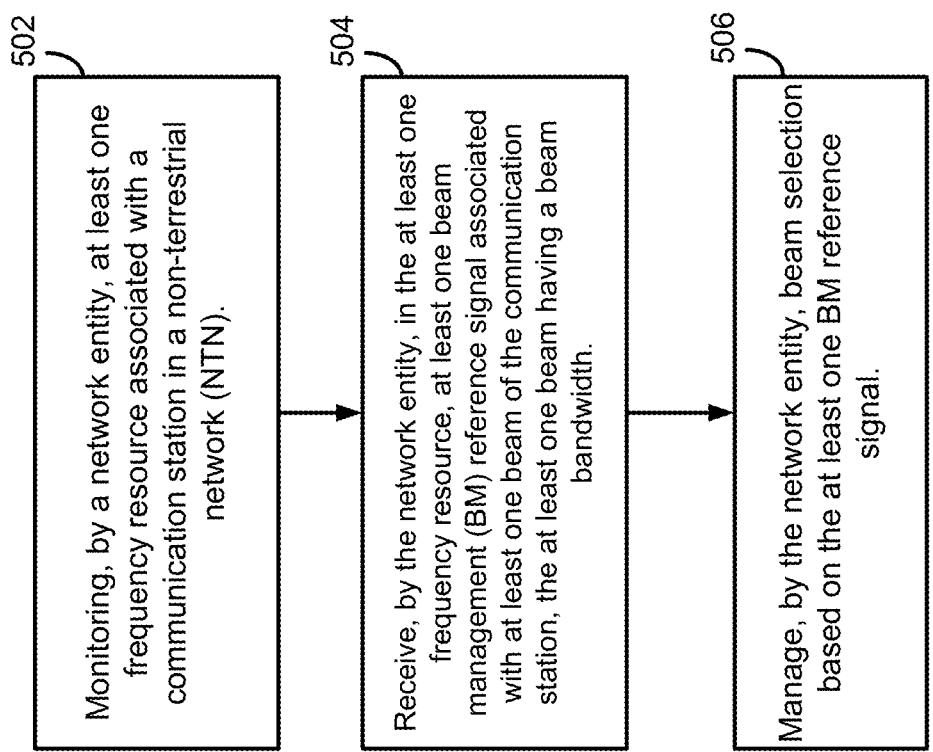
FIG. 5 is a block diagram illustrating example blocks executed to implement aspects of the present disclosure.
Figure 15:
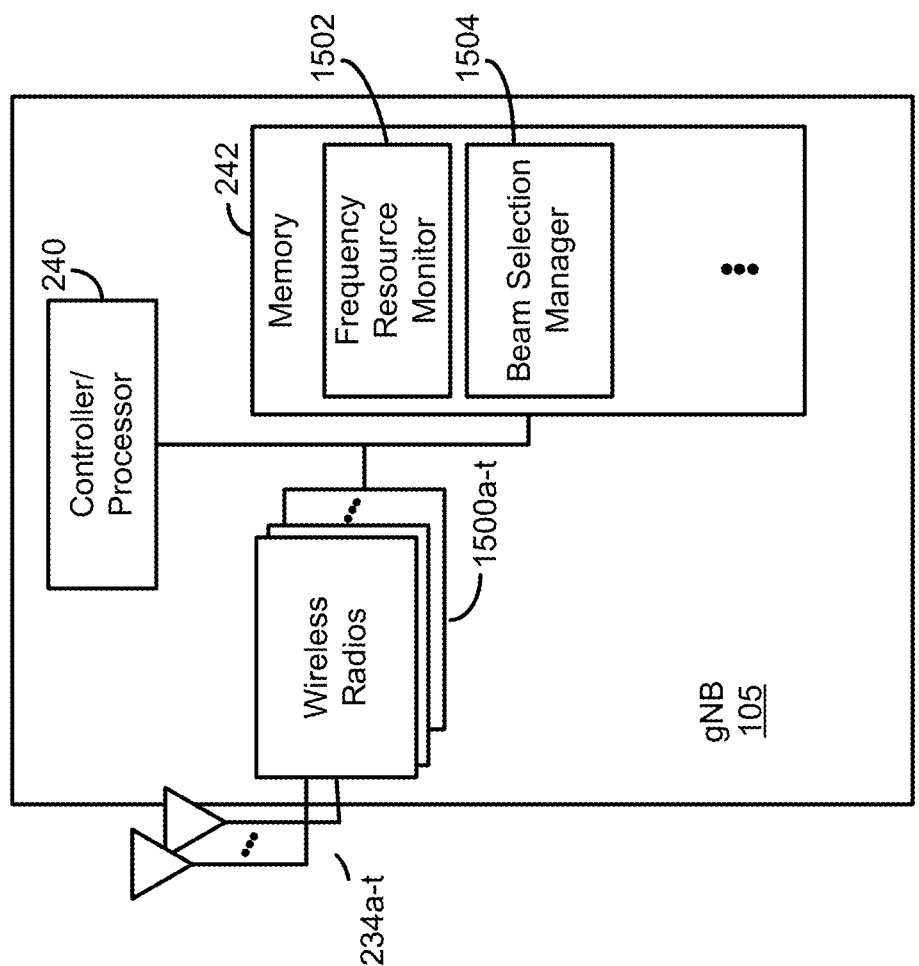
FIG. 15 is a block diagram illustrating a user equipment configured according to one aspect of the present disclosure.
Figure 16:
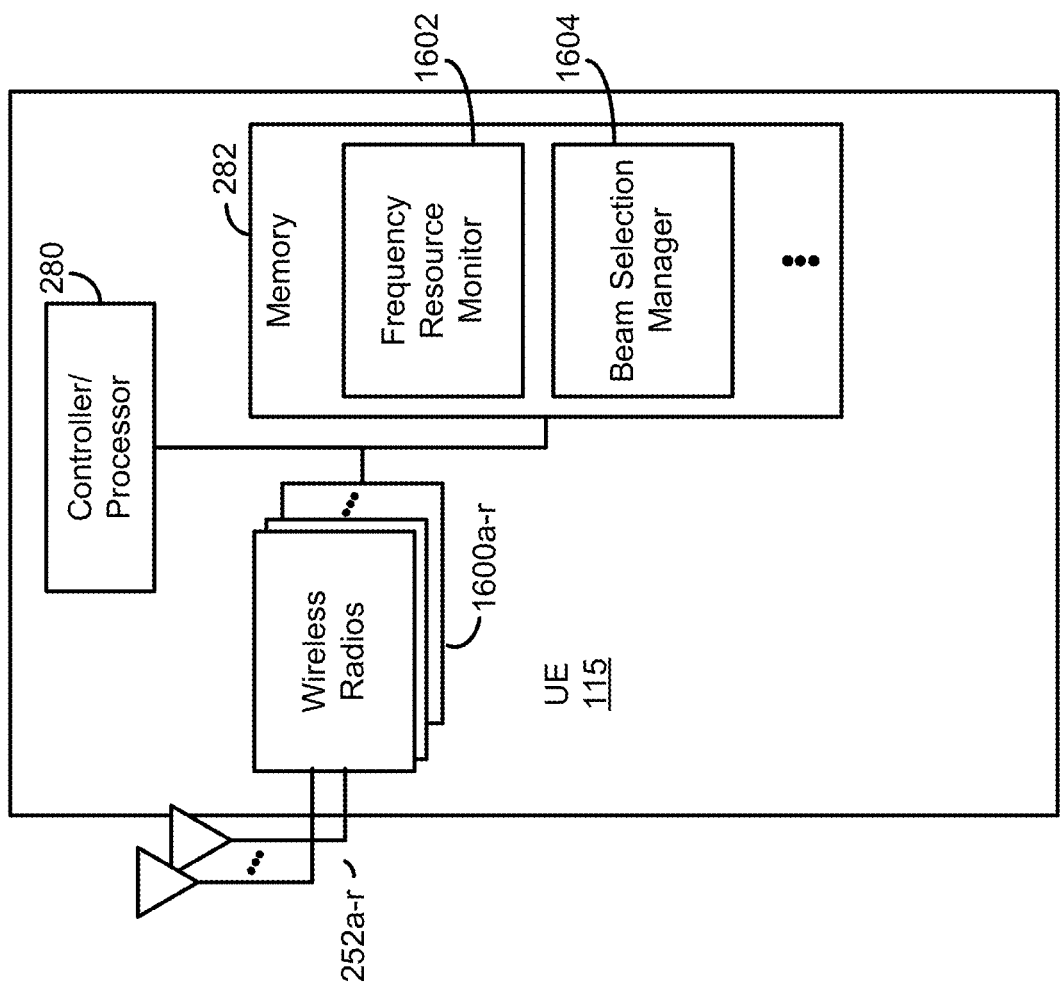
FIG. 16 is a block diagram illustrating a base station configured according to one aspect of the present disclosure.

FIGS. 4 and 5 are block diagrams illustrating example blocks executed by an NTN platform, and a wireless communication entity of an NTN system to implement aspects of the present disclosure. In aspects, the NTN platform may be any NTN platform as described above, and the wireless communication entity may be any wireless communication entity such as a UE, a ground station, a base station, or AP. It is noted that an AP may act as a relay node in the path from a gateway to a UE. In that sense, an AP may serve UEs, and may communicate with the NTN platform and relay signals to the served UEs, which may not directly communicate with the NTN platform. In some cases, the AP may provide reduced or different functionality than a gNB. The example blocks of FIGS. 4 and 5 will also be described with respect to gNB 105 as illustrated in FIG. 15, and UE 115 as illustrated in FIG. 16. FIG. 15 is a block diagram illustrating gNB 105 configured according to one aspect of the present disclosure. gNB 105 includes the structure, hardware, and components as illustrated for gNB 105 of FIG. 2. For example, gNB 105 includes controller/processor 240, which operates to execute logic or computer instructions stored in memory 242, as well as controlling the components of gNB 105 that provide the features and functionality of gNB 105. gNB 105, under control of controller/processor 240, transmits and receives signals via wireless radios 1500a-t and antennas 234a-t. Wireless radios 1500a-t includes various components and hardware, as illustrated in FIG. 2 for gNB 105, including modulator/demodulators 232a-t, MIMO detector 236, receive processor 238, transmit processor 220, and TX MIMO processor 230. FIG. 16 is a block diagram illustrating UE 115 configured according to one aspect of the present disclosure. UE 115 includes the structure, hardware, and components as illustrated for UE 115 of FIG. 2. For example, UE 115 includes controller/processor 280, which operates to execute logic or computer instructions stored in memory 282, as well as controlling the components of UE 115 that provide the features and functionality of UE 115. UE 115, under control of controller/processor 280, transmits and receives signals via wireless radios 1600*a-r* and antennas 252*a-r*. Wireless radios 1600*a-r* includes various components and hardware, as illustrated in FIG. 2 for UE 115, including modulator/demodulators 254*a-r*, MIMO detector 256, receive processor 258, transmit processor 264, and TX MIMO processor 266.

It is noted that the wireless communication entity with respect to which the example blocks of FIGS. 4 and 5 are described may be a base station, such as gNB 105 of FIG. 15, a UE, such UE 115 of FIG. 16, or any other wireless communication entity.

At block 400, an NTN platform determines to transmit a BM reference signal associated with a beam in the NTN. For example, NTN platform 510 (as show in FIG. 6) may determine to transmit a BM reference associated with one of beams 550*a-d* through 553*a-d* to a wireless communication entity (e.g., gNB 105 and/or UE 115). In aspects, the BM reference signal may be configured to facilitate beam switching/selection by the wireless communication entity. The beam may have a beam bandwidth, which may include a frequency resource within the frequency range for transmission of signals associated with the beam.

At block 402, a frequency resource for transmitting the BM reference signal is determined. For example, NTN platform 510 may determine the frequency resource within which to transmit the BM reference signal associated with the selected beam. As noted above, determining the frequency resource within which to transmit the BM reference signal associated with the selected beam may include determining the frequency resource within the beam bandwidth of the beam associated with the BM reference signal, determining the frequency resource in a bandwidth outside the beam bandwidth of the beam associated with the BM reference signal (e.g., a common bandwidth), or a combination thereof (e.g., a hybrid approach).

In aspects, the frequency resource within the beam bandwidth of the beam associated with the BM reference signal may also be the frequency resource over which data and control channels (e.g., PDSCH, SIB, PBCH, etc.) associated with the antenna that generates the beam may be transmitted. In this case, the BM reference signal associated with the beam (e.g., the BM reference signal transmitted from the same antenna that generates the beam) may be transmitted in a frequency resource within the beam bandwidth of the beam, which is also the beam bandwidth over which other data and control channels may be transmitted.

Figure 7B:
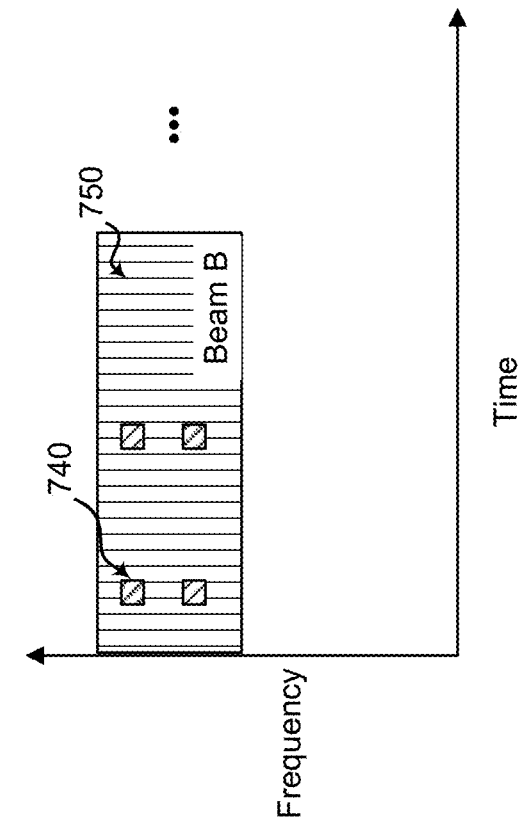
FIG. 7B shows another diagram illustrating an example transmission of a BM reference signal within the bandwidth of the beam associated with the BM reference signal.
Figure 7A:
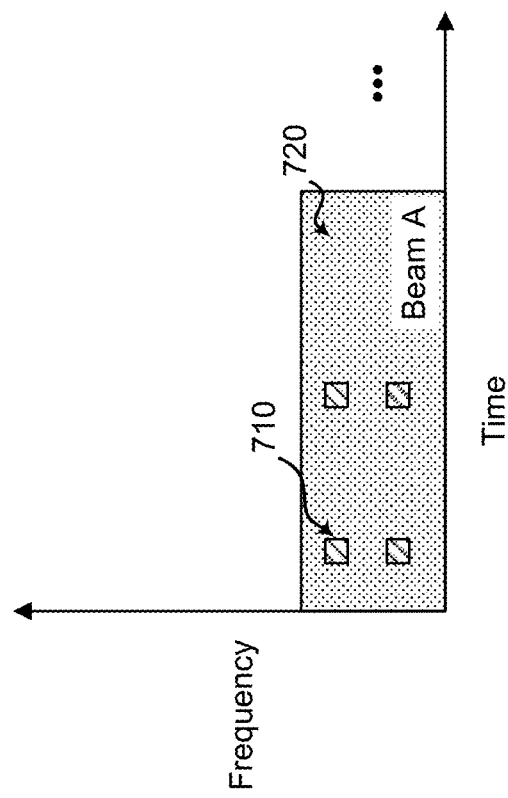
FIG. 7A shows a diagram illustrating an example transmission of a BM reference signal within the bandwidth of the beam associated with the BM reference signal.

FIG. 7A shows a diagram illustrating an example transmission of a BM reference signal within the bandwidth of the beam associated with the BM reference signal. In this example, BM reference signal 710 associated with beam A may be transmitted in a frequency resource within the bandwidth of beam A. Along with BM reference signal 710, data and control channels 720 associated with beam A are also transmitted within the bandwidth of beam A. Thus, in this case, both the BM reference signal and the data and control channels for beam A are transmitted within the bandwidth of beam A. FIG. 7B shows another diagram illustrating an example transmission of a BM reference signal within the bandwidth of the beam associated with the BM reference signal. In this example, BM reference signal 740 and data and control channels 750 associated with beam B may be transmitted within the bandwidth of beam B. In this case, the bandwidth of beam B may be different than the bandwidth of beam A. In aspects, the BM reference signal may be transmitted over disjoint resource elements (REs), e.g., when frequency domain comb is applied.

It will be appreciated that this approach of transmitting the BM reference signal within the bandwidth of the associated beam provides the advantage of a simple and straightforward transmitter implementation, as the BM reference signal and the other data and control channels are transmitted in the same beam bandwidth. In addition, the BM reference signal may reflect the frequency dependent channel fading of the beam bandwidth. However, under this approach, the wireless communication entity (e.g., UE, ground station, AP, and/or base station) may be required to perform inter-frequency measurements to evaluate the quality of each inter-frequency beam, which may result in a slower beam management procedure at the wireless communication entity.

In aspects, the frequency resource in which the BM reference signal associated with a beam may be transmitted may be within a common bandwidth. The common bandwidth may include a frequency resource, or a frequency range, that is common to multiple beams of the NTN platform. The common bandwidth may be used to transmit BM reference signals for the multiple beams. In a particular case, the BM reference signals for all inter-frequency beams of an NTN may be transmitted in the same common bandwidth. The common bandwidth may be any bandwidth within the various frequency ranges of the NTN footprint (e.g., frequency region within any of the frequency ranges, a portion of a beam bandwidth, a beam bandwidth, a cluster, or an inter-frequency range). For example, with reference to FIG. 6, any of beams 550*a-d* to 553*a-d*, or any portion of those beams and/or combination of those beams, may be utilized as the common bandwidth. For example, the bandwidth of beam 550*a* may be used as a common bandwidth, in which case the BM reference signal for multiple beams (e.g., any or all BM reference signals associated with any or all of beams 550*a-d* to 553*a-d*) may be transmitted within common bandwidth 550*a* (e.g., in a frequency resource of common bandwidth 550*a*). In another example, the combination of the bandwidths of intra-frequency beam 550*a* and 550*b* may be the common bandwidth, and in yet another example, the combination of the bandwidths of inter-frequency beam 552*a* and 553*a* may be the common bandwidth.

The BM reference signal for one or more beams may be transmitted within the common bandwidth, while the data and control channels for the one or more beams may be transmitted in the corresponding beam bandwidth of the one or more beams. For example, while the BM reference signal associated with beam 552*a* may be transmitted within common bandwidth 550*a*, the data and control channels for beam 552*a* may be transmitted within the beam bandwidth of beam 552*a*.

In aspects, the common bandwidth may be outside of the beam bandwidth of the beam associated with a BM reference to be transmitted over the common bandwidth, in which case the BM reference signal for the beam may be transmitted within the common bandwidth, which in this case may be different from the bandwidth in which the data and control channels for the beam may be transmitted. Alternatively, the common bandwidth may be within the same beam bandwidth of the beam associated with the BM reference signal to be transmitted, in which case the BM reference signal for the beam may be transmitted in the same beam bandwidth in which the data and control channels for the beam may be transmitted.

Figure 8B:
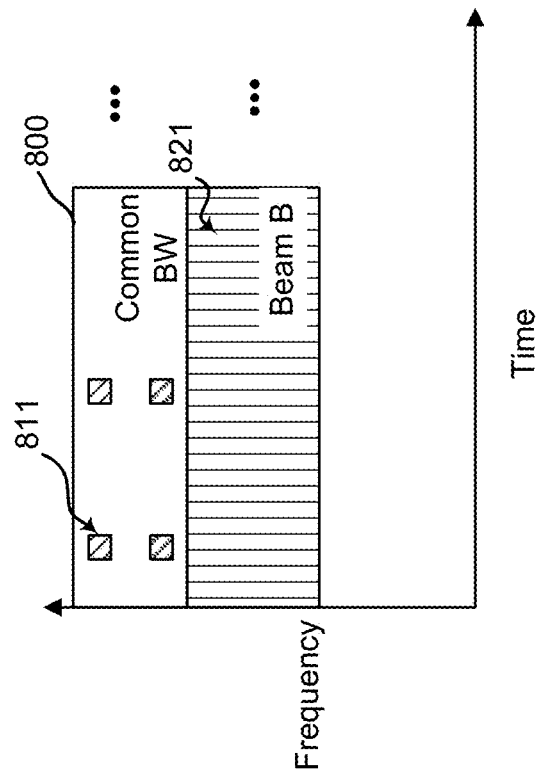
FIG. 8B shows a diagram further illustrating the example transmission of BM reference signals in a common bandwidth.
Figure 8A:
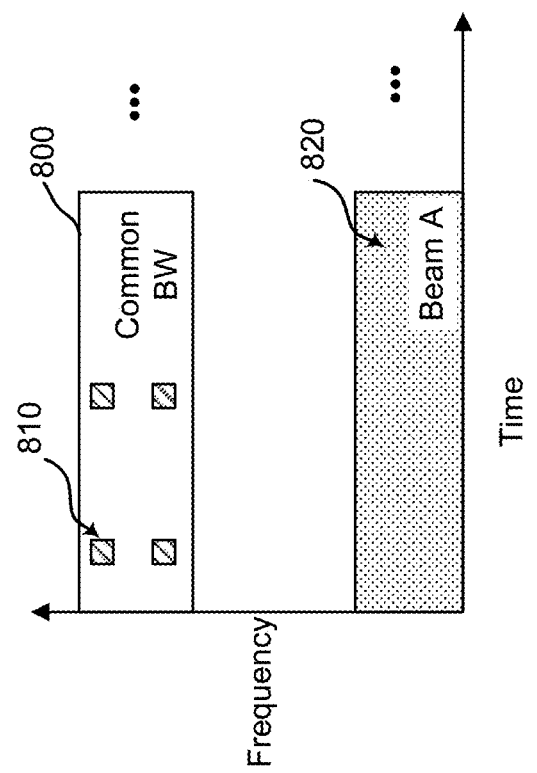
FIG. 8A shows a diagram illustrating an example transmission of BM reference signals in a common bandwidth.

FIGS. 8A and 8B show diagrams illustrating an example transmission of BM reference signals in a common bandwidth. In this example, BM reference signal 810 and data and control channels 820 may be associated with beam A, and BM reference signal 811 and data and control channels 821 may be associated with beam B. In one case, BM reference signal 810 may be transmitted in common bandwidth 800, while data and control channels 820 may be transmitted within the bandwidth of beam A. Additionally, or alternatively, BM reference signal 811 may be transmitted in common bandwidth 800, while data and control channels 821 may be transmitted within the bandwidth of beam B.

Figure 8D:
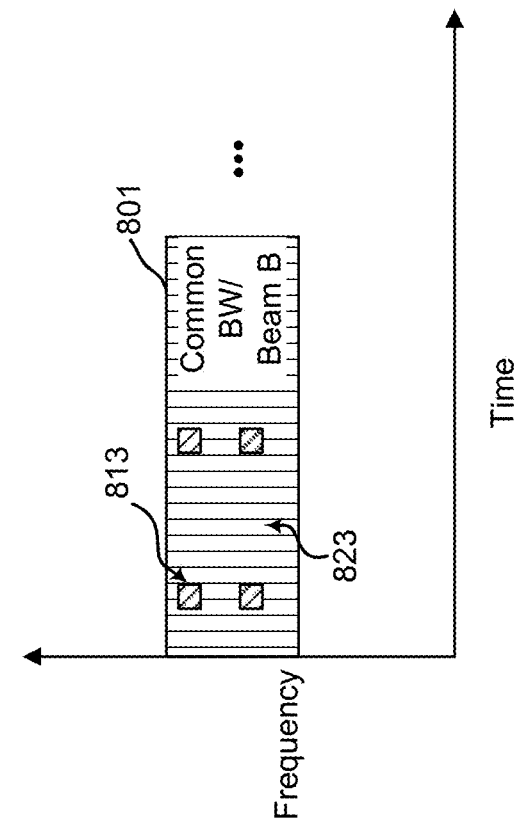
FIG. 8D shows a diagram further illustrating the other example transmission of BM reference signals in a common bandwidth.
Figure 8C:
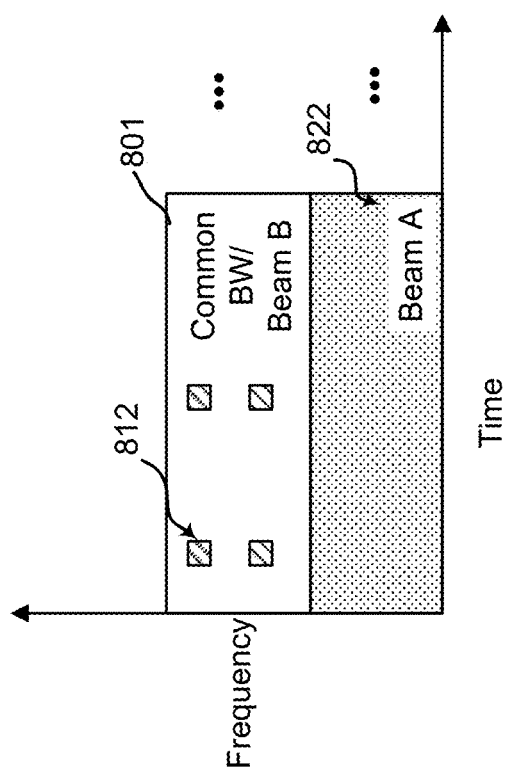
FIG. 8C shows a diagram illustrating another example transmission of BM reference signals in a common bandwidth.

As noted above, the common bandwidth may include the beam bandwidth of one of the inter-frequency beams of the NTN. For example, FIGS. 8C and 8D shows a diagram illustrating another example transmission of BM reference signals in a common bandwidth. In this example, BM reference signal 812 and data and control channels 822 may be associated with beam A, and BM reference signal 813 and data and control channels 823 may be associated with beam B. The bandwidth of beam B may be the common bandwidth. Thus, in this case, BM reference signal 812 may be transmitted in common bandwidth/beam B bandwidth 801, while data and control channels 822 may be transmitted within the bandwidth of beam A. Additionally, or alternatively, BM reference signal 813 may also be transmitted in common bandwidth/beam B bandwidth 801, along with data and control channels 823. Thus, in this case, the BM reference signal and the data and control channels for beam A may be transmitted in different bandwidths, while the BM reference signal and the data and control channels for beam B may be transmitted in the same bandwidth.

It will be appreciated that although the examples discussed herein detail operations with two beams and a single common bandwidth, the functionality disclosed is equally applicable to operations with more than two beams and more than one common bandwidths. In some cases, any number of BM reference signals may be transmitted in the common bandwidth. Additionally, there may be more than one common bandwidths provided for an NTN, and configuration of the NTN may specify how the various BM reference signals for the various beams are to be mapped to the common bandwidths.

It will also be appreciated that this common bandwidth approach for BM provides the advantage of great flexibility and simplicity, as a wireless communication entity may measure the signal quality of multiple beams without re-tuning the RF to the different beam frequencies. As such, the wireless communication entity may measure the signal quality of the multiple beams by tuning to the frequency of the beam associated with the common bandwidth.

Figure 9B:
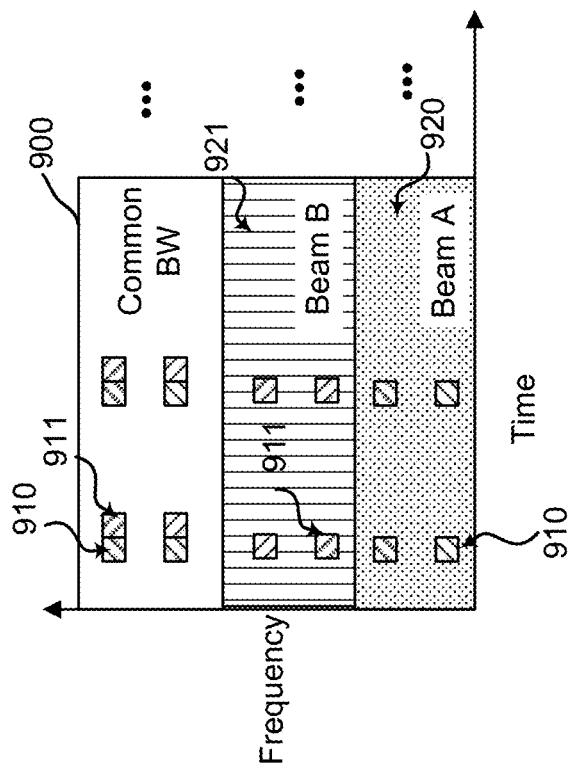
FIG. 9B shows another diagram illustrating the example transmission of BM reference signals using a hybrid approach.
Figure 9A:
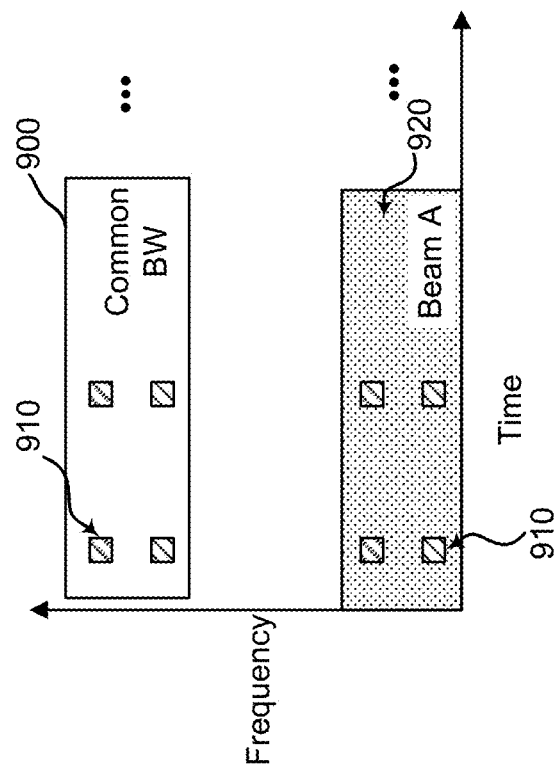
FIG. 9A shows a diagram illustrating an example transmission of BM reference signals using a hybrid approach.

FIGS. 9A and 9B show diagrams illustrating an example transmission of BM reference signals using a hybrid approach. Under the hybrid approach a BM reference signal associated with a beam may be transmitted within the bandwidth of the beam, and may also be transmitted in a common bandwidth. For example, BM reference signal 910 and data and control channels 920 may be associated with beam A. BM reference signal 910 may be transmitted in a frequency resource within the bandwidth of beam A. Along with BM reference signal 910, data and control channels 920 associated with beam A may also be transmitted within the bandwidth of beam A. Additionally, BM reference signal 910 may also be transmitted in a frequency resource of common bandwidth 900. Thus, in this case, the BM reference signal may be transmitted in both the bandwidth of beam A and the common bandwidth, while the data and control channels for beam A are transmitted within the bandwidth of beam A.

In some aspects, a plurality of BM reference signals respectively associated with a plurality of beams may also be transmitted in the common bandwidth. For example, as shown in FIG. 9B, BM reference signal 910 and data and control channels 920 may be associated with beam A, and BM reference signal 911 and data and control channels 921 may be associated with beam B. In this example, BM reference signal 910 and BM reference signal 911 may both be transmitted in common bandwidth 900. In addition, BM reference signal 910 may also be transmitted in a frequency resource within the bandwidth of beam A, and BM reference signal 911 may also be transmitted in a frequency resource within the bandwidth of beam B. Data and control channels 920 associated with beam A may be transmitted within the bandwidth of beam A, and data and control channels 921 associated with beam B may be transmitted within the bandwidth of beam B.

It will be appreciated that this hybrid approach for BM provides the advantage of giving a wireless communication entity the flexibility to select whether to measure the signal quality of beams by monitoring the frequencies of the different beams, or by monitoring the common bandwidth (s). The wireless communication entity may select either based on what is more convenient during operations. For example, a wireless communication entity tuned to a particular beam may decide not to re-tune to a common bandwidth to measure the BM reference signal of the particular beam, and instead measure the BM reference signal in the currently tuned frequency.

Referring back to FIG. 4, at block 402, the BM reference signal associated with the beam is transmitted to the wireless communication entity in the determined frequency resource. In aspects, as discussed above, the BM reference signal associated with the beam may be transmitted in a bandwidth that is different than the bandwidth in which the data and control channels associated with the beam may be transmitted. For example, the data and control channels associated with a beam may be transmitted within the bandwidth of the beam, while the BM reference signal associated with the beam may be transmitted in a bandwidth that is outside of the beam bandwidth of the beam (e.g., a common bandwidth). In these cases, the transmission of the BM reference signal and the transmission of the data and control channels may be multiplexed. In aspects, the multiplexing of the BM reference signal and the data and control channels for the beam may be a TDM and/or may be frequency domain multiplexing (FDM).

Figure 10A:
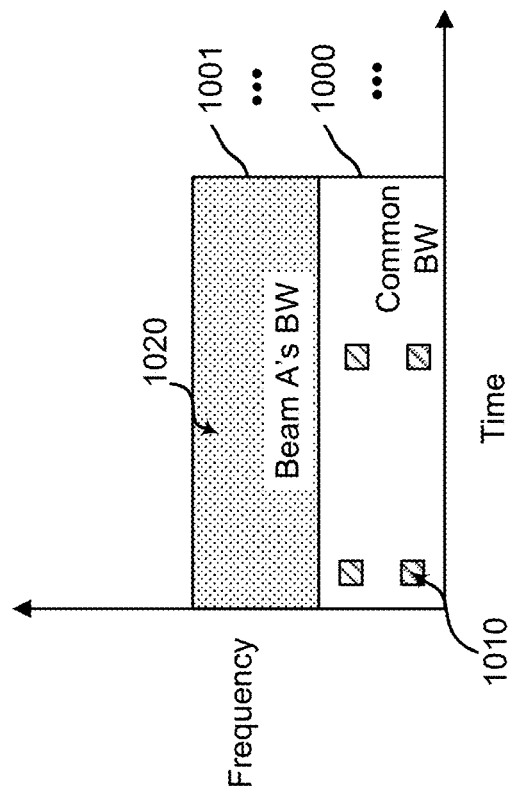
FIG. 10A shows a diagram illustrating an example of a TDM transmission of a BM reference signal and data and control channels associated with a beam.

FIG. 10A shows a diagram illustrating an example of a TDM transmission of a BM reference signal and data and control channels associated with a beam. In this example, BM reference signal 1010 and data and control channels 720 may be associated with beam A. BM reference signal may be transmitted in common bandwidth 1000, while data and control channels 720 may be transmitted within beam A's bandwidth 1001. The transmission of BM reference signal 1010 and the transmission of data and control channels 720 may be TDM'd, in which the transmission of BM reference signal 1010 in common bandwidth 1000 occurs at different times than the transmission of data and control channels 720 within beam A's bandwidth 1001. TDM'ing BM reference signal 1010 and data and control channels 720 may result in no concurrent transmissions in the different bandwidths. For example, while BM reference signal 1010 is transmitted in common bandwidth 1000 at periods t1 and t2, no transmissions of signals associated with beam A take place within beam A's bandwidth 1001. Similarly, while data and control channels 720 is transmitted in common bandwidth 1000 at periods t3 and t4, no transmissions of BM reference signals associated with beam A take place within common bandwidth 1000. In aspects, a time gap may be inserted between the transmissions of the BM reference signal and the transmission of data and control channels to facilitate RF switching between measurements from one beam frequency to the other beam frequency. A more in-depth discussion of the time gap is included below.

Figure 10B:
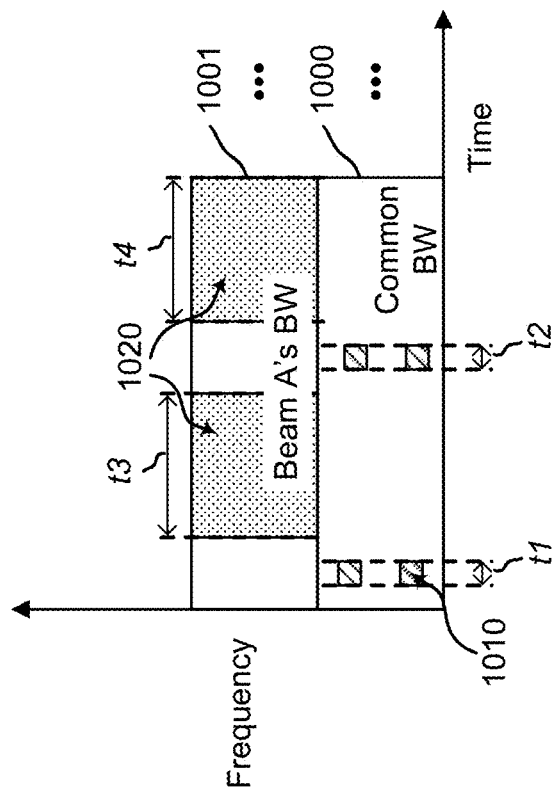
FIG. 10B shows a diagram illustrating an example of an FDM transmission of a BM reference signal and data and control channels associated with a beam.

FIG. 10B shows a diagram illustrating an example of an FDM transmission of a BM reference signal and data and control channels associated with a beam. In this example, BM reference signal 1010 and data and control channels 720 may be associated with beam A. BM reference signal may be transmitted in common bandwidth 1000, while data and control channels 720 may be transmitted within beam A's bandwidth 1001. The transmissions of BM reference signal 1010 and the transmission of data and control channels 720 may be FDM'd, in which the transmission of BM reference signal 1010 in common bandwidth 1000 may occur at the same time as the transmission of data and control channels 720 within beam A's bandwidth 1001. FDM'ing BM reference signal 1010 and data and control channels 720 may result in concurrent transmissions in the different bandwidths. It will be appreciated that this FDM approach may result in a transmitted configured with a wider bandwidth for transmitting both the BM reference signals and data and control channels associated with a beam.

As noted above, a common bandwidth may support transmissions of BM reference signals correspondingly associated with multiple beams of the NTN. Thus, BM reference signals associated with different beams may be transmitted in the common bandwidth. In these cases, the transmission of the BM reference signals associated with the different beams may be multiplexed in the common bandwidth. In aspects, the multiplexing of the multiple BM reference signals may be a TDM and/or may be FDM. Whether the multiplexing of the multiple BM reference signals is TDM or FDM may depend on whether the multiple BM reference signals are time-aligned. Determining whether different BM reference signals are time-aligned may include determined the source of the BM reference signals. For example, FIGS. 11A and 11B show configurations of NTN network 1100 illustrating time-misalignments. FIG. 11A shows a configuration in which a BM reference signal may be transmitted from satellite 1120 to wireless communication entity 1150, and a different BM reference signal may be transmitted from satellite 1121. Although signals for each of satellites 1120 and 1121 may be from the same gateway 1110, the BM reference signals may nonetheless be time-misaligned because the propagation delay from the gateway through different satellites to the wireless communication entity 1150 may be different. FIG. 11B shows a configuration in which multiple BM reference signals may be transmitted from satellite 1122 to wireless communication entity 1150. In this case, signals to satellite 1122 may come from different gateways 1111 and 1112. Therefore, although the multiple BM reference signals are transmitted to wireless communication entity 1150 from the same satellite 1122, the BM reference signals may nonetheless be time-misaligned because the propagation delay from gateways to satellite 1122 may be different. In contrast, where BM reference signals are transmitted from the same NTN platform (e.g., same satellite/HAPS), and signals to the NTN platform are from the same gateway, BM reference signals may be time-aligned with a same propagation delay.

Figure 12A:
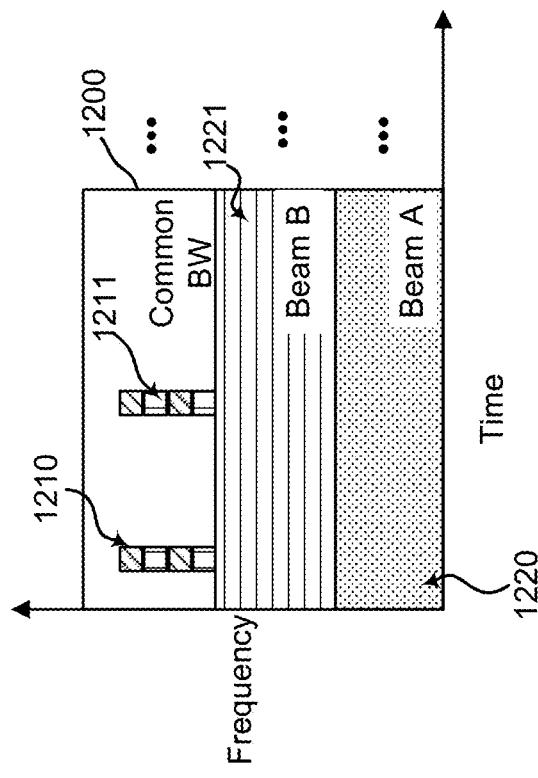
FIG. 12A shows a diagram illustrating an example of a TDM transmission of multiple BM reference signals in a common bandwidth.

In aspects, multiplexing the transmission of BM reference signals respectively associated with multiple inter-frequency beams may include TDM'ing the multiple BM reference signals when the multiple BM reference signals are time-aligned or time-misaligned. For example, FIG. 12A shows a diagram illustrating an example of a TDM transmission of multiple BM reference signals in a common bandwidth. In this example, BM reference signal 1210 and data and control channels 1220 may be associated with beam A, and BM reference signal 1211 and data and control channels 1221 may be associated with beam B. In this example, BM reference signal 1210 and BM reference signal 1211 may both be transmitted in common bandwidth 1200. In this case, the REs of BM reference signal 1210 and the REs of BM reference signal 1211 may be transmitted in the same frequency resource in the common bandwidth, but at different times. As noted above, this TDM approach may be used whether the different BM reference signals associated with different beams are determined to be time-aligned or time-misaligned, as the transmissions of the different BM reference signals occur at different time. In aspects, a guard period in time may be provided between transmissions of different BM reference signals in order to avoid partial symbol overlapping between BM reference signals without time alignment. A more in-depth discussion of the guard period is included below.

Figure 12B:
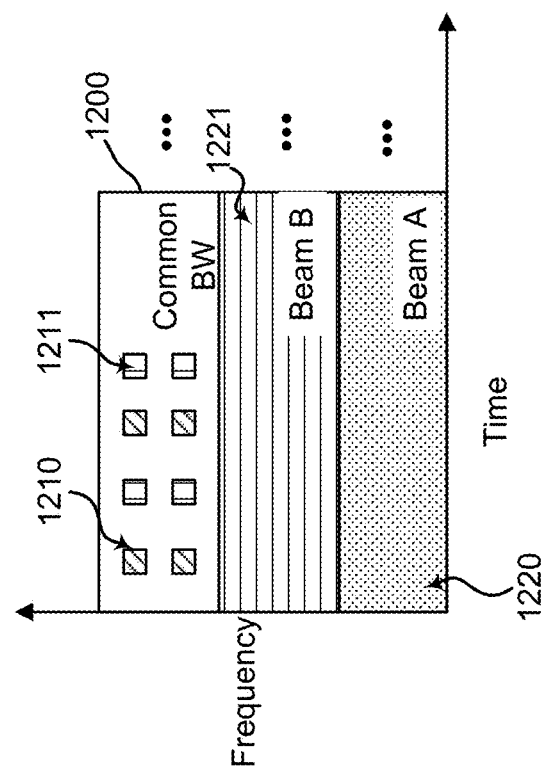
FIG. 12B shows a diagram illustrating an example of an FDM transmission of multiple BM reference signals in a common bandwidth.

In aspects, multiplexing the transmission of BM reference signals respectively associated with multiple inter-frequency beams may include FDM'ing the different BM reference signals associated with different beams when the different BM reference signals are time-aligned. For example, FIG. 12B shows a diagram illustrating an example of an FDM transmission of multiple BM reference signals in a common bandwidth. In this example, BM reference signal 1210 and data and control channels 1220 may be associated with beam A, and BM reference signal 1211 and data and control channels 1221 may be associated with beam B. BM reference signal 1210 and BM reference signal 1211 may both be transmitted in common bandwidth 1200. In this case, the REs of BM reference signal 1210 and the REs of BM reference signal 1211 may be transmitted in different frequency resource within the common bandwidth at the same time. As noted above, this TDM approach may be used when the different BM reference signals associated with different beams are determined to be time-aligned, but may not be effective when the different BM reference signals associated with different beams are time-misaligned. In aspects, the FDM'ed BM reference signals may be transmitted in a same symbol with different frequency offsets.

It will be appreciated that although the examples discussed above detail multiplexing operations of BM reference signals associated with two beams, the functionality disclosed is equally applicable to operations with more than two BM reference signals. Thus, the discussion of multiplexing two BM reference signals is for illustrative purposes and should not be construed as limiting in any way.

Figure 12C:
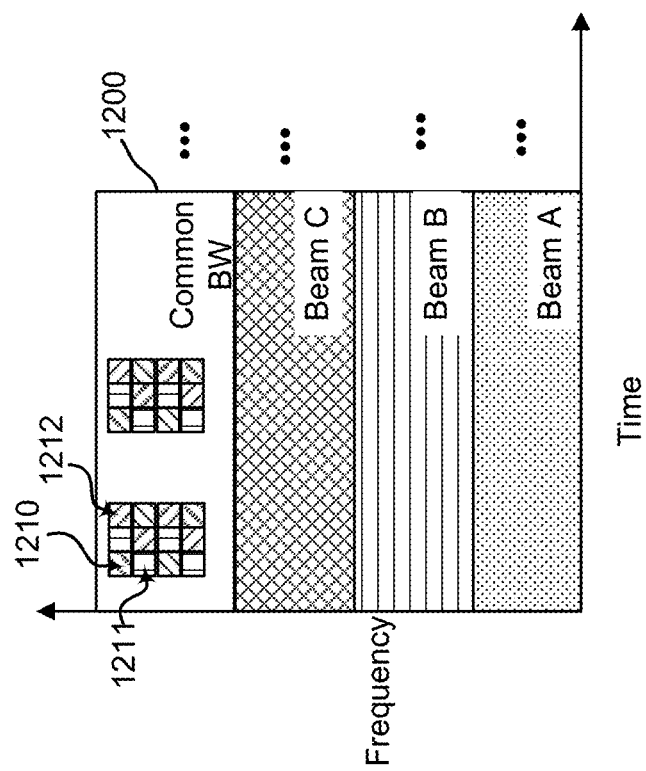
FIG. 12C shows a diagram illustrating an example of beam management reference signals transmitted using time domain multiplexing and frequency domain multiplexing in a common bandwidth.

In aspects, a combination of FDM and TDM may be employed on multiple BM reference signals transmitted in the common bandwidth. For example, BM reference signals that are time aligned may be transmitted using TDM and FDM to increase the number of BM reference signals that may be transmitted in the same common bandwidth. FIG. 12C shows a diagram illustrating an example of BM reference signals transmitted using TDM and FDM in a common bandwidth. In this example, BM reference signal 1210 may be associated with beam A, BM reference signal 1211 may be associated with beam B, and BM reference signal 1212 may be associated with beam C. BM reference signal 1210, BM reference signal 1211, and BM reference signal 1212 may all be transmitted in common bandwidth 1200. In this case, BM reference signals 1210, 1211, and 1212 may be TDM'd and FDM'd. For example, BM reference signal 1210 may be transmitted in a different frequency resource than BM reference signal 1211, but at the same time (e.g., FDM). In addition, BM reference signal 1211 may also be transmitted in the same frequency resource as BM reference signal 1210, but at a different time (e.g., TDM). Similarly, BM reference signal 1211 may be transmitted in a different frequency resource than BM reference signal 1212, but at the same time (e.g., FDM), and may also be transmitted in the same frequency resource as BM reference signal 1212, but at a different time (e.g., TDM). Similarly still, BM reference signal 1210 may be transmitted in a different frequency resource than BM reference signal 1212, but at the same time (e.g., FDM), and may also be transmitted in the same frequency resource as BM reference signal 1212, but at a different time (e.g., TDM). As will be appreciated, selectively employing TDM and FDM, separately and aggregately, allows for the transmission of an increased number of BM reference signal REs.

Referring now to FIG. 5, at block 502, a wireless communication entity monitors at least one frequency resource associated with a communication station in an NTN. For example, an AP may execute functionality for monitoring, by the AP, at least one frequency resource associated with a communication station in an NTN. It is again noted that an AP may serve UEs that may not directly communicate with the NTN platform. The AP may act as a relay node in the path from a gateway to the UEs. The AP may communicate with the NTN platform and may relay signals from the NTN platform to the served UEs. In some cases, the AP may provide reduced or different functionality than a gNB.

In an additional or alternative aspect, a UE, such as UE 115 may execute, under control of controller/processor 280, frequency resource monitor 1602, stored in memory 282. The execution environment of frequency resource monitor 1602 provides the procedural steps for monitoring, by UE 115, at least one frequency resource associated with a communication station in an NTN. As noted above, the monitored frequency resource may be a beam bandwidth, or a frequency resource within the beam bandwidth, of a beam associated with a BM reference signal to be received, or may be a common bandwidth, a common frequency resource, or a frequency resource within a common bandwidth. Monitoring the at least one frequency resource may include tuning an RF of the wireless communication entity to the frequency of the frequency resource/bandwidth being monitored. In aspects, the at least one frequency resource may include a plurality of frequency resources, such as a plurality of beam bandwidths or a plurality of common bandwidths described above.

At block 504, the wireless communication entity receives, in the at least one frequency resource, at least one BM reference signal associated with at least one beam of the communication station. For example, a UE, such as UE 115a of system 300, receives signals using antennas 252a-r and wireless radios 1600a-r. After decoding the signals, under control of controller/processor 280, UE 115a may determine at least one BM reference signal associated with at least one beam of the communication station. In an additional or alternative aspect, the AP may execute functionality to receive signals using wireless radios and antennas. After decoding the signals, under control of a controller/processor, the AP may determine at least one BM reference signal associated with at least one beam of the communication station.

In accordance with the disclosure above, the at least one BM reference signal may be a BM reference signal associated with the beam in whose beam bandwidth the BM reference signal was received. In other aspects, the at least one BM reference signal may be a BM reference signal associated with a beam whose beam bandwidth is different than the beam bandwidth in which the BM reference signal was received. For example, the BM reference signal may be received in a common bandwidth, and the common bandwidth may be a different bandwidth than the beam bandwidth of the beam associated with the BM reference signal. The beam bandwidth of the beam associated with the BM reference signal may be a bandwidth in which data and control channels for the beam may be received. In this case, the BM reference signal and the data and control channels may be multiplexed in accordance with the above discussion.

In aspects, the at least one BM reference signal associated with at least one beam may include a plurality of BM reference signals respectively associated with a plurality of beams. For example, different BM reference signals for different beams in the NTN may be transmitted in a common bandwidth or common frequency resource. In this case, the wireless communication entity may receive the different BM reference signals for the different beams. As will be appreciated, these aspects of the disclosure have been discussed in more detail above.

In aspects, the BM reference signals received in the common bandwidth may be multiplexed, in accordance with the discussion above with respect to FIG. 4. As noted above, the multiplexing of the BM reference signal may depend on the time-alignment of the different BM reference signals. Various aspects of the present disclosure provide mechanisms for handling timing misalignments among the BM reference signals received in the common bandwidth.

In one case, where the BM reference signals associated with different beams are time-aligned, receiving the BM reference signals may be based on timing information obtained from an SSB signal or other synchronization/reference signals (SSB/RSs) received in any of the beams associated with the BM reference signals. In this case, the timing is determined once for all the BM reference signals associated with the different beams. From the NTN platform perspective, an SSB signal or other synchronization/reference signals may be transmitted in the bandwidth of any of the beams associated with the time-aligned BM reference signals.

In a case where the BM reference signals associated with the different beams are not time-aligned, the NTN platform may transmit timing information for BM reference signals in an SSB/RS and may transmit the SSB/RS in the beam bandwidth of each of the beams associated with the BM reference signals. In this case, the timing for receiving a particular BM reference signal in the common bandwidth may be based on the timing information obtained from SSB/RS received in the beam bandwidth of the beam associated with the particular BM reference signal. For example, FIG. 13A shows a diagram illustrating an example of timing information transmitted and/or received in the beam bandwidth of the beam associated with a BM reference signal. In this example, BM reference signal 1310 may be associated with beam B, and BM reference signal 1311 may be associated with beam A. BM reference signals 1310 and 1311 may be received in common bandwidth 1300, but these BM reference signals may be time-misaligned. Additionally, an SSB signal and/or another reference signal (RS) 1330 may be transmitted/received within the beam bandwidth of beam A, and an SSB/RS 1331 may be transmitted/received within the beam bandwidth of beam B. In this case, receiving BM reference signal 1311 in common bandwidth 1300 may include determining a timing for BM reference signal 1311 based on timing information obtained from SSB/RS 1330. Similarly, receiving BM reference signal 1310 in common bandwidth 1300 may include determining a timing for BM reference signal 1310 based on timing information obtained from SSB/RS 1331.

Additionally, or alternatively, the NTN platform may transmit timing information for BM reference signals by transmitting signals in the common bandwidth. In this case, the timing for receiving time-misaligned BM reference signals in the common bandwidth may be based on timing information obtained from signals received in the common bandwidth. In aspects, the NTN platform may transmit an SSB/RS associated with the particular beam in the common bandwidth. From the wireless communication entity's perspective, determining the timing for BM reference signal associated with a particular beam may include receiving the SSB/RS associated with the particular beam in the common bandwidth. Transmitting/receiving the SSB/RS in the common bandwidth may facilitate timing synchronized reception of the BM reference signal in the common bandwidth. For example, FIG. 13B shows a diagram illustrating an example of timing information transmitted and/or received from an SSB/RS transmitted/received in the common bandwidth. In this example, BM reference signal 1310 may be associated with beam A, and BM reference signal 1311 may be associated with beam B. BM reference signals 1310 and 1311 may be transmitted/received in common bandwidth 1300, but these BM reference signals may be time-misaligned. In aspects, SSB/RS 1330 associated with beam A may be transmitted/received within common bandwidth 1300. Similarly, SSB/RS 1331 associated with beam B may be transmitted/received with within common bandwidth 1300. In this case, receiving BM reference signal 1310 in common bandwidth 1300 may include determining a timing for BM reference signal 1310 based on timing information obtained from SSB/RS 1330 transmitted/received in common bandwidth 1300, and receiving BM reference signal 1311 in common bandwidth 1300 may include determining a timing for BM reference signal 1311 based on timing information obtained from SSB/RS 1331 also transmitted/received in common bandwidth 1300.

Still additionally, or alternatively, the NTN platform may transmit timing information for BM reference signals by transmitting a longer or extended cyclic prefix (CP) that may be added to the BM reference signals, or transmitting multiple symbols for the BM reference signals with phase continuity across symbol boundaries. In this case, the timing misalignment for receiving time-misaligned BM reference signals in the common bandwidth may be observed by the longer CP, or on the multiple symbols for the BM reference signals. For example, FIG. 13C shows a diagram illustrating an example of timing information for BM reference signals transmitted and/or received based on extended symbols. In this example, BM reference signal 1310 may be associated with beam A, and BM reference signal 1311 may be associated with beam B. BM reference signals 1310 and 1311 may be transmitted/received in common bandwidth 1300, but these BM reference signals may be time-misaligned. In aspects, a CP may be added to BM reference signal 1310, or additional symbols 1310b of BM reference signal 1310 may be transmitted by the NTN platform. Similarly, a CP may be added to BM reference signal 1311, or additional symbols 1311b for BM reference signal 1311 may be transmitted by the NTN platform. Under this approach, the timing synchronization for receiving the BM reference signals may be relaxed by the wireless communication entity based on the extended transmissions. In aspects, as noted above, a guard period may be provided between transmissions of time-misaligned BM reference signals in order to avoid partial symbol overlap between two BM reference signals.

With reference back to FIG. 5, at block 506, the wireless communication entity manages beam selection based on the at least one BM reference signal. For example, an AP may execute, under control of a controller/processor, functionality for managing, by the AP, beam selection based on the at least one BM reference signal. In an additional or alternative aspect, a UE, such as UE 115 may execute, under control of controller/processor 280, beam selection manager 1604, stored in memory 282. The execution environment of beam selection manager 1604 provides the procedural steps for managing, by UE 115, beam selection based on the at least one BM reference signal. In aspects, managing the beam selection may include determining a signal quality of the beam associated with the BM reference signal based on the BM reference signal. As noted above, the at least one BM reference signal may include a plurality of BM reference signals respectively associated with a plurality of beams of the NTN. The wireless communication entity may determine the signal quality of multiple beams of the plurality of beams based on the respective BM reference signal. Based on the various measurement of signal quality, the wireless communication entity may select a beam for communication. For example, the wireless communication entity may select the beam with the highest signal quality. In some cases, the wireless communication entity may determine that the currently selected beam's signal quality is below a quality threshold, in which case the wireless communication entity may determine to switch to another beam, based on the signal quality measure of the different beams.

In aspects, BM reference signal measurements may be configured by the network. In these cases, each BM reference signal associated with a beam may be configured as a measurement resource. In some cases, multiple BM reference signals may be configured in the same resource set.

Figures 14A, 14B:
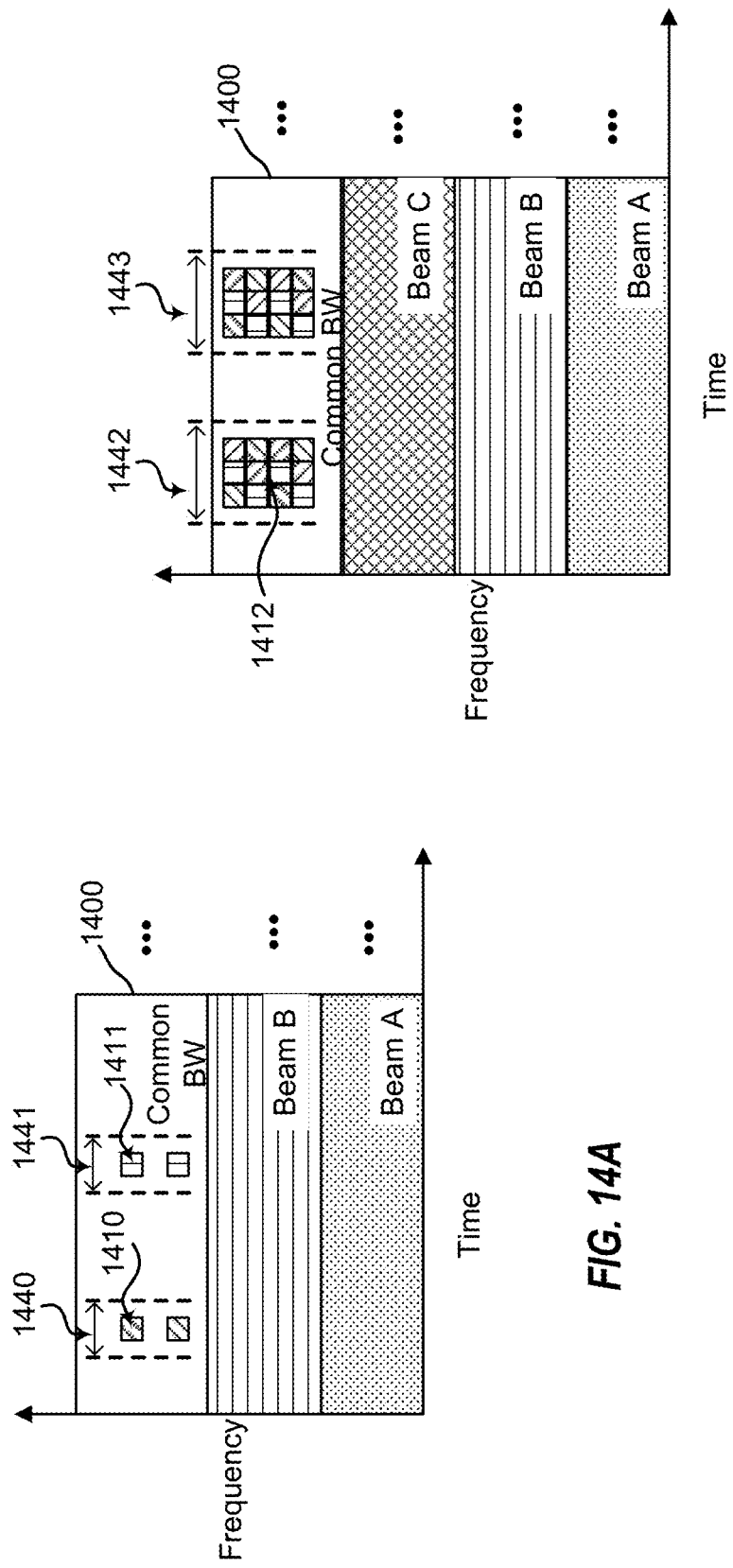
FIG. 14A shows a diagram illustrating an example of transmission of BM reference signals with separate measurement gaps.
FIG. 14B shows a diagram illustrating an example of transmission of BM reference signals with a single measurement gap.

As noted above, measurement gaps, timing gaps, and guard periods may be configured and added to BM reference signal transmissions in order to address potential timing misalignments and/or frequency switching. In aspects, for transmissions of BM reference signals that are time-misaligned, separate measurement gaps may be configured. For example, FIG. 14A shows a diagram illustrating an example of transmission of BM reference signals with separate measurement gaps. In this example, BM reference signal 1410 and BM reference signal 1411, transmitted in common bandwidth 1400, may be time-misaligned. A measurement gap 1440 may be provided to guard the transmission of BM reference signal 1410, and a separate measurement gap 1441 may be provided to guard the transmission of BM reference signal 1411. In some aspects, for transmissions of BM reference signals that are time-aligned, a single measurement gap may be configured. For example, FIG. 14B shows a diagram illustrating an example of transmission of BM reference signals with a single measurement gap. In this example, BM reference signals 1412 may include BM reference signals respectively associated with beams A, B, and C. BM reference signals 1412 may be time-aligned. In this case, a single measurement gap may be provided to guard the transmissions of BM reference signals 1412. For example, single measurement gap 1442 may be provided to guard one of the transmissions of BM reference signals 1412, and single measurement gap 1443 may be provided to guard another of the transmissions of BM reference signals 1412. In aspects, the measurement gap may be configured either based on a Layer 3 measurement mechanism, or a Layer 1 symbol level rate matching when the BM reference signals fall within a beam bandwidth of a beam of the beams associated with the BM reference signals.

In aspects, the beams of the NTN may be grouped into cells of different sizes and configurations based on the associated frequency range of the various beams. The cells may include groups a single beam, at least two adjacent beams within the same frequency range, a beam cluster including all beams within the same frequency range, at least two beams associated with different frequency ranges; and at least two adjacent clusters. In that sense, each group may be defined as a cell. For example, with reference to FIG. 6, beam 550a may be grouped into a group of a single beam, and cell 520 may be defined by this group. In this example, adjacent beams 550c and 550d may be grouped into a group, and cell 521 may be defined by this group. Beams 551a-d, which may include all the beams within frequency range $f_2$, may be grouped into a group defining cell 522. In this example, beams 552a-d within frequency range $f_3$, and beams 552a-d within frequency range $f_4$ may be grouped into a group defining cell 523. As shown, cell 523 includes inter-frequency beams. In aspects, each frequency range may be defined as a bandwidth part (BWP), and when multiple beams with different frequency ranges are mapped into a same cell, the beams may be mapped to BWPs.

In some aspects, to reference signals designs for beam management (BM) in non-terrestrial networks (NTNs) may include an apparatus, such as a wireless communication entity, that is configured to monitor at least one frequency resource associated with a communication station in a non-terrestrial network (NTN); receiving, in the at least one frequency resource, at least one beam management (BM) reference signal associated with at least one beam of the communication station, the at least one beam having a beam bandwidth; and manage beam selection based on the at least one BM reference signal. In some implementations, the apparatus includes a wireless device, such as by a user equipment (UE). In some implementations, the apparatus may include at least one processor, and a memory coupled to the processor. The processor may be configured to perform operations described herein with respect to the wireless device. In some other implementations, the apparatus may include a non-transitory computer-readable medium having program code recorded thereon and the program code may be executable by a computer for causing the computer to perform operations described herein with reference to the wireless device. In some implementations, the apparatus may include an interface and a processor system coupled to the interface and configured to perform one or more operations. In some implementations, the apparatus may include one or more means configured to perform operations described herein.

In a first aspect, the BM reference signal include a channel state information reference signal (CSI-RS).

In a second aspect, alone or in combination with the first aspect, the BM reference signal is associated with a measurement gap based on a Layer 1 symbol level rate matching.

In a third aspect, alone or in combination with one or more of the first through second aspects, the apparatus (e.g., a wireless communication entity) includes a user equipment (UE), a ground station, an access point, or a base station.

In a fourth aspect, alone or in combination with one or more of the first through third aspects, the communication station is an airborne platform and includes a satellite, a balloon, an aircraft, or an unmanned aerial vehicle.

In a fifth aspect, alone or in combination with one or more of the first through fourth aspects, receiving the BM reference signal includes receiving the BM reference signal in: the frequency resource of the beam bandwidth of the at least one beam associated with the at least one BM reference signal; and a common frequency resource.

In a sixth aspect, alone or in combination with the fifth aspect, the apparatus determines whether to receive the BM reference signal in the frequency resource of the beam bandwidth of the at least one beam associated with the at least one BM reference signal or in the common frequency resource.

In a seventh aspect, alone or in combination with one or more of the first through fourth aspects, the least one frequency resource includes: the frequency resource of the beam bandwidth of the at least one beam associated with the at least one BM reference signal; a common frequency resource that is common to a plurality of beams of the communication station; or a combination thereof.

In an eighth aspect, alone or in combination with the seventh aspect, receiving the at least one BM reference signal in the frequency resource of the beam bandwidth of the at least one beam associated with the at least one BM reference signal includes receiving the at least one BM reference signal along with data and control channels of an antenna generating the at least one beam.

In a ninth aspect, alone or in combination with the seventh aspect, receiving the at least one BM reference signal includes receiving the at least one BM reference signal in a frequency resource outside the beam bandwidth of the at least one beam multiplexed with data and control channel of an antenna generating the at least one beam associated with the BM reference signal.

In a tenth aspect, alone or in combination with the ninth aspect, the data and control channel are received within the frequency resource of the beam bandwidth of the at least one beam associated with the at least one BM reference signal.

In an eleventh aspect, alone or in combination with the ninth aspect, the multiplex including a time domain multiplex or a frequency domain multiplex.

In a twelfth aspect, alone or in combination with the eleventh aspect, the time domain multiplex includes a transmission gap time between the data and control channels and the at least one BM reference signal.

In a thirteenth aspect, alone or in combination with the twelfth aspect, the apparatus switches a radio frequency (RF) radio from the frequency resource outside the beam bandwidth of the at least one beam associated with the at least one BM reference signal to the frequency resource of the beam bandwidth of the at least one beam associated with the at least one BM reference signal.

In a fourteenth aspect, alone or in combination with the twelfth aspect, the apparatus switches the RF radio from the frequency resource of the beam bandwidth of the at least one beam associated with the at least one BM reference signal to the frequency resource outside the beam bandwidth of the at least one beam associated with the at least one BM reference signal.

In a fifteenth aspect, alone or in combination with the seventh aspect, the common frequency resource includes a frequency resource outside the beam bandwidth of the at least one beam associated with the at least one BM reference signal.

In a sixteenth aspect, alone or in combination with the seventh aspect, the common frequency resource includes the frequency resource of the beam bandwidth of the at least one beam associated with the at least one BM reference signal.

In a seventeenth aspect, alone or in combination with the seventh aspect, the at least one BM reference signal includes a plurality of BM reference signals in the common frequency resource, each BM reference signal of the plurality of BM reference signals associated with a corresponding beam of the plurality of beams.

In an eighteenth aspect, alone or in combination with the seventeenth aspect, the apparatus measures the plurality of BM reference signals received in the common frequency resource without retuning a radio frequency from a frequency resource to a different frequency resource.

In a nineteenth aspect, alone or in combination with the eighteenth aspect, receiving the plurality of BM reference signals in the common frequency resource includes determining a timing of the at least one BM reference signal.

In a twentieth aspect, alone or in combination with the nineteenth aspect, to determine the timing of the at least one BM reference signal, the apparatus determines, when at least two BM reference signals of the plurality of BM reference signals are time aligned, the timing based on a synchronization signal from a beam of the plurality of beams.

In a twenty-first aspect, alone or in combination with the nineteenth aspect, to determine the timing of the at least one BM reference signal, the apparatus determines, when the at least two BM reference signals are time misaligned, the timing based on a synchronization signal from the least one beam associated with the at least one BM reference signal.

In a twenty-second aspect, alone or in combination with the nineteenth aspect, to determine the timing of the at least one BM reference signal, the apparatus determines, when the at least two BM reference signals are time misaligned, the timing based on a timing within the common frequency resource.

In a twenty-third aspect, alone or in combination with the twenty-second aspect, to determine the timing of the at least one BM reference signal based on the timing within the common frequency resource, the apparatus obtains the timing from a synchronization signal, transmitted in the common frequency resource, associated with the at least one beam associated with the at least one BM reference signal.

In a twenty-fourth aspect, alone or in combination with the twenty-second aspect, to determine the timing of the at least one BM reference signal based on the timing within the common frequency resource, the apparatus determines that the at least one BM reference signal includes an extended cyclic prefix.

In a twenty-fifth aspect, alone or in combination with the twenty-second aspect, to determine the timing of the at least one BM reference signal based on the timing within the common frequency resource, the apparatus determines that multiple symbols the at least one BM reference signal are transmitted with phase continuity across symbol boundaries.

In a twenty-sixth aspect, alone or in combination with the twenty-second aspect, to determine the timing of the at least one BM reference signal based on the timing within the common frequency resource, the apparatus determines that a guard period is present between the misaligned at least two BM reference signals.

In some aspects, to reference signals designs for beam management (BM) in non-terrestrial networks (NTNs) may include an apparatus, such as a communication station (e.g., a satellite, a balloon, an aircraft, or an unmanned aerial vehicle), that is configured to determine to transmit a beam management (BM) reference signal associated with a beam in a non-terrestrial network (NTN), the BM reference signal configured to facilitate beam switching, and the beam having a beam bandwidth; determine a frequency resource for transmitting the BM reference signal; and transmit, to a wireless communication entity, the BM reference signal in the determined frequency resource. In some implementations, the apparatus includes a wireless device, such as by a user equipment (UE). In some implementations, the apparatus may include at least one processor, and a memory coupled to the processor. The processor may be configured to perform operations described herein with respect to the wireless device. In some other implementations, the apparatus may include a non-transitory computer-readable medium having program code recorded thereon and the program code may be executable by a computer for causing the computer to perform operations described herein with reference to the wireless device. In some implementations, the apparatus may include an interface and a processor system coupled to the interface and configured to perform one or more operations. In some implementations, the apparatus may include one or more means configured to perform operations described herein.

In a twenty-seventh aspect, the wireless communication entity includes a user equipment (UE), a ground station, an access point, or a base station.

In a twenty-eighth aspect, alone or in combination with the twenty-seventh aspect, the BM reference signal include a channel state information reference signal (CSI-RS).

In a twenty-ninth aspect, alone or in combination with one or more of the twenty-seventh through twenty-eighth aspects, the BM reference signal is associated with a measurement gap based on a Layer 1 symbol level rate matching.

In a thirtieth aspect, alone or in combination with one or more of the twenty-seventh through twenty-ninth aspects, the BM reference signal configured to facilitate beam switching includes a configuration to facilitate beam switching from a first beam to a second beam.

In a thirty-first aspect, alone or in combination with one or more of the twenty-seventh through thirtieth aspects, the first beam and the second beam are inter-frequency beams or intra-frequency beams.

In a thirty-second aspect, alone or in combination with one or more of the twenty-seventh through thirty-first aspects, data and control channels of an antenna generating the beam are transmitted within a frequency resource of the beam bandwidth of the beam.

In a thirty-third aspect, alone or in combination with the thirty-second aspect, to determine the frequency resource for transmitting the BM reference signal, the apparatus determines the frequency resource based on the frequency resource of the beam bandwidth of the beam associated with the BM reference signal; determines a common frequency resource, wherein the common frequency resource is common to a plurality of beams of the NTN; or a combination thereof.

In a thirty-fourth aspect, alone or in combination with the thirty-third aspects, in the combination thereof, the apparatus determines the frequency resource based on the frequency resource of the beam bandwidth of the beam associated with the BM reference signal.

In a thirty-fifth aspect, alone or in combination with one or more of the thirty-third through thirty-third aspects, in the combination thereof, the apparatus determines the common frequency resource.

In a thirty-sixth aspect, alone or in combination with one or more of the thirty-third through thirty-fifth aspects, in the combination thereof, the apparatus transmits the BM reference signal in: the frequency resource determined based on the beam bandwidth of the beam associated with the BM reference signal; and the common frequency resource.

In a thirty-seventh aspect, alone or in combination with the thirty-third aspect, to transmit the BM reference signal, the apparatus transmits, when the frequency resource is determined based on the frequency resource of the beam bandwidth of the beam associated with the BM reference signal, the BM reference signal in the frequency resource of the beam bandwidth of the beam associated with the BM reference signal along with the data and control channels of the antenna generating the beam.

In a thirty-eighth aspect, alone or in combination with the thirty-seventh aspect, to transmit the BM reference signal in the frequency resource of the beam bandwidth of the beam associated with the BM reference signal, the apparatus transmits the BM reference signal over disjointed resource elements of the frequency resource of the beam bandwidth.

In a thirty-ninth aspect, alone or in combination with the thirty-third aspect, to determine the frequency resource for transmitting the BM reference signal, the apparatus multiplexes the BM reference signal with the data and control channels.

In a fortieth aspect, alone or in combination with the thirty-ninth aspect, to determine the frequency resource for transmitting the BM reference signal, the apparatus determines the frequency resource outside the beam bandwidth of the beam associated with the BM reference signal.

In a forty-first aspect, alone or in combination with one or more of the thirty-ninth through fortieth aspects, to multiplex, the apparatus time domain multiplexes the BM reference signal with the data and control channels.

In a forty-second aspect, alone or in combination with one or more of the thirty-ninth through forty-first aspects, to multiplex, the apparatus frequency domain multiplexes the BM reference signal with the data and control channels.

In a forty-third aspect, alone or in combination with the forty-first aspect, to time domain multiplexing the BM reference signal with the data and control channels, the apparatus transmits the data and control channels in the frequency resource of the beam bandwidth of the beam associated with the BM reference signal at a first transmission time.

In a forty-fourth aspect, alone or in combination with one or more of the forty-first through forty-third aspects, to time domain multiplexing the BM reference signal with the data and control channels, the apparatus transmits the BM reference signal in the frequency resource outside the beam bandwidth of the beam associated with the BM reference signal at a second transmission time different than the first transmission time.

In a forty-fifth aspect, alone or in combination with the forty-fourth aspect, the apparatus provides a transmission gap in time between the transmitting the data and control channels and the transmitting the BM reference signal.

In a forty-sixth aspect, alone or in combination with the forty-fifth aspect, the transmission gap configured to allow the wireless communication entity to perform switching a radio frequency (RF) radio from the frequency resource outside the beam bandwidth of the beam associated with the BM reference signal to the frequency resource of the beam bandwidth of the beam associated with the BM reference signal.

In a forty-seventh aspect, alone or in combination with one or more of the forty-fifth through forty-sixth aspects, the transmission gap configured to allow the wireless communication entity to perform switching the RF radio from the frequency resource of the beam bandwidth of the beam associated with the BM reference signal to the frequency resource outside the beam bandwidth of the beam associated with the BM reference signal.

In a forty-eighth aspect, alone or in combination with the forty-second aspect, to frequency domain multiplexing the BM reference signal with the data and control channels, the apparatus transmits the data and control channels in the frequency resource of the beam bandwidth of the beam associated with the BM reference signal.

In a forty-ninth aspect, alone or in combination with one or more of the forty-second through forty-eighth aspects, to frequency domain multiplexing the BM reference signal with the data and control channels, the apparatus transmits the BM reference signal in the frequency resource outside the beam bandwidth of the beam associated with the BM reference signal.

In a fiftieth aspect, alone or in combination with the thirty-third aspect, the common frequency resource includes a frequency resource outside the beam bandwidth of the beam associated with the BM reference signal.

In a fifty-first aspect, alone or in combination with one or more of the thirty-third through fiftieth aspects the common frequency resource includes the frequency resource of the beam bandwidth of the beam associated with the BM reference signal.

In a fifty-second aspect, alone or in combination with the thirty-third aspect, a bandwidth of the common frequency resource includes a portion of a bandwidth of one beam of the plurality of beams, or the bandwidth of the one beam of the plurality of beams.

In a fifty-third aspect, alone or in combination with the thirty-third aspect, the plurality of beams including the beam, and each beam of the plurality of beams is associated with at least one corresponding BM reference signal.

In a fifty-fourth aspect, alone or in combination with the fifty-third aspect, the apparatus transmits the corresponding BM reference signals for each beam of the plurality of beams in the common frequency resource.

In a fifty-fifth aspect, alone or in combination with the fifty-fourth aspect, transmitting the corresponding BM reference signals in the common frequency resource allows the wireless communication entity to measure the BM reference signals without retuning a radio frequency of the wireless communication entity from a frequency resource to a different frequency resource.

In a fifty-sixth aspect, alone or in combination with the fifty-fourth aspect, the apparatus multiplexes multiplexing at least two BM reference signals associated with at least two respective beams of the plurality of beams based on a time alignment of the at least two BM reference signals.

In a fifty-seventh aspect, alone or in combination with the fifty-sixth aspect, to multiplex, the apparatus determines whether the at least two BM reference signals are time-aligned.

In a fifty-eighth aspect, alone or in combination with one or more of the fifty-sixth through fifty-seventh aspects, to multiplex, the apparatus frequency domain multiplexes the at least two BM reference signals when the at least two BM reference signals are time-aligned.

In a fifty-ninth aspect, alone or in combination with one or more of the fifty-sixth through fifty-eighth aspects, to multiplex, the apparatus time domain multiplexes the at least two BM reference signals when the at least two BM reference signals are time-aligned or time-misaligned.

In a sixtieth aspect, alone or in combination with the fifty-sixth aspect, the apparatus transmits, when the at least two BM reference signals are time aligned, a synchronization signal in a bandwidth of a beam associated with any of the at least two BM reference signals that are time aligned, the synchronization signal including timing information.

In a sixty-first aspect, alone or in combination with the first sixtieth aspect, the apparatus transmits, when the at least two BM reference signals are time misaligned: the synchronization signal in the bandwidth of the beam associated with the BM reference signal; or the timing information within the common frequency resource.

In a sixty-second aspect, alone or in combination with the sixty-first aspect, to transmit the timing information within the common frequency resource, the apparatus transmits, in the common frequency resource, the timing information in a synchronization signal associated with the beam associated with the BM reference signal.

In a sixty-third aspect, alone or in combination with the sixty-first aspect, to transmit the timing information within the common frequency resource, the apparatus transmits, in the common frequency resource, an extended cyclic prefix for the BM reference signal, or multiple symbols with phase continuity across symbol boundaries for the BM reference signal.

In a sixty-fourth aspect, alone or in combination with the sixty-first aspect, to transmit the timing information within the common frequency resource, the apparatus transmits, in the common frequency resource, a guard period between the at least two BM reference signals that are time misaligned.

In a sixty-fifth aspect, alone or in combination with one or more of the twenty-seventh through thirtieth aspects, the NTN includes a plurality of beams, each beam of the plurality of beams having a beam bandwidth, and the beam bandwidth of each beam is associated with a frequency range.

In a sixty-sixth aspect, alone or in combination with the sixty-fifth aspect, the apparatus groups beams of the plurality of beams based on the associated frequency range of each beam of the plurality of beams.

In a sixty-seventh aspect, alone or in combination with the sixty-sixth aspect, the apparatus designates each group as a cell, wherein each beam of the plurality of beams is mapped to a corresponding cell.

In a sixty-eighth aspect, alone or in combination with the sixty-seventh aspect, grouping includes grouping into groups of a single beam, at least two adjacent beams within the same frequency range, a beam cluster including all beams within the same frequency range, at least two beams associated with different frequency ranges; or at least two adjacent clusters.

In a sixty-ninth aspect, alone or in combination with the sixty-seventh aspects, the apparatus, when multiple beams associated with different frequency ranges are mapped to the same cell, maps the beams to different bandwidth parts within the cell.

In a seventieth aspect, alone or in combination with one or more of the twenty-seventh through thirtieth aspects, the NTN includes a plurality of beams, each beam of the plurality of beams associated with at least one corresponding BM reference signal of a plurality of BM reference signals.

In a seventy-first aspect, alone or in combination with the seventieth aspect, each BM reference signal of the plurality of BM reference signals is configured as a measurement resource.

In a seventy-second aspect, alone or in combination with the seventy-first aspect, multiple BM reference signals of the plurality of BM reference signals are configured in a same resource set.

In a seventy-third aspect, alone or in combination with the seventy-second aspects, at least one measurement gap is provided based on a time alignment of BM reference signals of the plurality of BM reference signals, the at least one measurement gap facilitating handling of timing inconsistencies among the BM reference signals of the plurality of BM reference signals and frequency switching by the wireless communication entity In a seventy-fourth aspect, alone or in combination with the seventy-third aspect, the at least one measurement gap includes a single measurement gap when at least two BM reference signals of the plurality of BM reference signal are time-aligned.

In a seventy-fifth aspect, alone or in combination with the seventy-third aspect, when at least two BM reference signals of the plurality of BM reference signal are time-misaligned, the at least one measurement gap includes a separate measurement gap for each of the at least two BM reference signals.

In a seventy-sixth aspect, alone or in combination with the seventy-third aspect, wherein the at least one measurement gap is based on a Layer 3 measurement mechanism.

In a seventy-seventh aspect, alone or in combination with the seventy-third aspect, wherein the at least one measurement gap is based on a Layer 1 symbol level rate matching when the BM reference signals of the plurality of BM reference signals fall within a beam bandwidth of a beam of the plurality of beams.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The functional blocks and modules in FIGS. 4 and 5 may include processors, electronics devices, hardware devices, electronics components, logical circuits, memories, software codes, firmware codes, etc., or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Skilled artisans will also readily recognize that the order or combination of components, methods, or interactions that are described herein are merely examples and that the components, methods, or interactions of the various aspects of the present disclosure may be combined or performed in ways other than those illustrated and described herein.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. Computer-readable storage media may be any available media that can be accessed by a general purpose or special purpose computer. By way of example, and not limitation, such computer-readable media can include RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, a connection may be properly termed a computer-readable medium. For example, if the software is transmitted from a website, server, or other remote source using a coaxial cable, fiber optic cable, twisted pair, or digital subscriber line (DSL), then the coaxial cable, fiber optic cable, twisted pair, or DSL, are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C) or any of these in any combination thereof.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method of wireless communication, comprising:
   monitoring, by a wireless communication entity, at least one frequency resource associated with a communication station in a non-terrestrial network (NTN), the at least one frequency resource including a common frequency resource that is common to beam management (BM) reference signals associated with a plurality of beams of the communication station;
   receiving, by the wireless communication entity, in the at least one frequency resource, a BM reference signal associated with a first beam of the plurality of beams of the communication station, the common frequency resource outside a beam bandwidth of the first beam; and
   managing, by the wireless communication entity, beam selection based at least in part on the BM reference signal.

2. The method of claim 1, wherein the BM reference signal comprises a channel state information reference signal (CSI-RS).

3. The method of claim 1, wherein the BM reference signal is associated with a measurement gap based on a Layer 1 symbol level rate matching.

4. The method of claim 1, wherein the wireless communication entity includes a user equipment (UE), a ground station, an access point, or a base station.

5. The method of claim 1, wherein the communication station is an airborne platform and includes a satellite, a balloon, an aircraft, or an unmanned aerial vehicle.

6. The method of claim 1, wherein receiving the at least one BM reference signal includes receiving the BM reference signal in a frequency resource within the beam bandwidth of the first beam or receiving the BM reference signal in the common frequency resource.

7. The method of claim 6, wherein the wireless communication entity determines whether to receive the BM reference signal in the frequency resource within the beam bandwidth of the first beam associated with the BM reference signal, in the common frequency resource, or in both the frequency resource and the common frequency resource.

8. The method of claim 1, further comprising receiving, in the common frequency resource, a second BM reference signal associated with a second beam of the plurality of beams of the communication station, wherein the beam selection is managed based further on the second BM reference signal.

9. An apparatus configured for wireless communication, the apparatus comprising:
   at least one processor; and
   a memory coupled to the at least one processor,
   wherein the at least one processor is configured to:
      monitor, by a wireless communication entity, at least one frequency resource associated with a communication station in a non-terrestrial network (NTN), the at least one frequency resource including a common frequency resource that is common to beam management (BM) reference signals associated with a plurality of beams of the communication station;
      receive, in the at least one frequency resource, a BM reference signal associated with a first beam of the plurality of beams of the communication station, the common frequency resource outside a beam bandwidth of the first beam; and
      manage beam selection based at least in part on the BM reference signal.

10. The apparatus of claim 9, wherein the least one frequency resource includes a frequency resource of the beam bandwidth of the first beam associated with the BM reference signal and the common frequency resource.

11. The apparatus of claim 10, wherein, to receive the BM reference signal in the frequency resource of the beam bandwidth of the first beam, the at least one processor is further configured to receive the BM reference signal along with data and control channels of an antenna generating the first beam.

12. The apparatus of claim 10, wherein, to receive the BM reference signal, the at least one processor is further configured to receive the BM reference signal in the common frequency resource multiplexed with data and control channels of an antenna generating the first beam.

13. The apparatus of claim 12, wherein the data and control channels are received within the frequency resource of the beam bandwidth of the first beam, and wherein the multiplexing includes a time domain multiplex or a frequency domain multiplex.

14. The apparatus of claim 13, wherein the time domain multiplex includes a transmission gap time between receipt of the data and control channels and receipt of the BM reference signal.

15. The apparatus of claim 14, wherein the at least one processor is further configured to switch a radio frequency (RF) radio from the common frequency resource that is outside the beam bandwidth of the first beam to the frequency resource of the beam bandwidth of the first beam.

16. The apparatus of claim 14, wherein the at least one processor is further configured to switch a radio frequency (RF) radio from the frequency resource of the beam bandwidth of the first beam to the common frequency resource that is outside the beam bandwidth of the first beam.

17. A non-transitory computer-readable medium having program code recorded thereon, the program code executable by a computer for causing the computer to:
   monitor, by a wireless communication entity, at least one frequency resource associated with a communication station in a non-terrestrial network (NTN), the at least one frequency resource including a common frequency resource that is common to beam management (BM) reference signals associated with a plurality of beams of the communication station;
   receive, in the at least one frequency resource, a BM reference signal associated with a first beam of the plurality of beams of the communication station, the common frequency resource outside a beam bandwidth of the first beam; and
   manage beam selection based at least in part on the BM reference signal.

18. The non-transitory computer-readable medium of claim 17, wherein:
   the at least one frequency resource includes a frequency resource of the beam bandwidth of the first beam and the common frequency resource; and
   each of the BM reference signals is associated with a corresponding beam of the plurality of beams.

19. The non-transitory computer-readable medium of claim 18, wherein the program code is further executable by the computer to cause the computer to measure the BM reference signals received in the common frequency resource without retuning a radio frequency (RF) radio from the common frequency resource to a different frequency resource.

20. The non-transitory computer-readable medium of claim 19, wherein, to receive the BM reference signals in the common frequency resource, the program code is further executable by the computer to cause the computer to determine a timing of the BM reference signal associated with the first beam.

21. The non-transitory computer-readable medium of claim 20, wherein, to determine the timing of the BM reference signal, the program code is further executable by the computer to cause the computer to determine, when at least two BM reference signals of the plurality of BM reference signals within the common frequency resource are time aligned, the timing based on a synchronization signal from a beam of the plurality of beams.

22. The non-transitory computer-readable medium of claim 20, wherein, to determine the timing of the BM reference signal, the program code is further executable by the computer to cause the computer to determine, when at least two BM reference signals within the common frequency resource are time misaligned, the timing based on a synchronization signal from the first beam.

23. The non-transitory computer-readable medium of claim 20, wherein, to determine the timing of the BM reference signal, the program code is further executable by the computer to cause the computer to determine, when at least two BM reference signals within the common frequency resource are time misaligned, the timing based on a timing within the common frequency resource.

24. The non-transitory computer-readable medium of claim 23, wherein, to determine the timing of the BM reference signal based on the timing within the common frequency resource, the program code is further executable by the computer to cause the computer to obtain the timing from a synchronization signal that is transmitted in the common frequency resource and that is associated with the first beam.

25. The non-transitory computer-readable medium of claim 23, wherein, to determine the timing of the BM reference signal based on the timing within the common frequency resource, the program code is further executable by the computer to cause the computer to determine that the BM reference signal includes an extended cyclic prefix.

26. The non-transitory computer-readable medium of claim 23, wherein to determine the timing of the BM reference signal based on the timing within the common frequency resource, the program code is further executable by the computer to cause the computer to determine that multiple symbols of the BM reference signal are transmitted with phase continuity across symbol boundaries.

27. The non-transitory computer-readable medium of claim 23, wherein to determine the timing of the BM reference signal based on the timing within the common frequency resource, the program code is further executable by the computer to cause the computer to determine that a guard period is present between the time misaligned at least two BM reference signals.

28. An apparatus configured for wireless communication, the apparatus comprising:

means for monitoring, by a wireless communication entity, at least one frequency resource associated with a communication station in a non-terrestrial network (NTN), the at least one frequency resource including a common frequency resource that is common to beam management (BM) reference signals associated with a plurality of beams of the communication station;

means for receiving in the at least one frequency resource, a BM reference signal associated with a first beam of the plurality of beams of the communication station, the common frequency resource outside a beam bandwidth of the first beam; and means for managing beam selection based at least in part on the BM reference signal.

29. The apparatus of claim 28, wherein the least one frequency resource includes the common frequency resource but does not include a frequency resource within the beam bandwidth of the first beam.

30. The apparatus of claim 28, wherein the least one frequency resource includes the common frequency resource and a frequency resource of the beam bandwidth of the first beam.

* * * * *